US011733933B2

United States Patent
Azechi et al.

(10) Patent No.: US 11,733,933 B2
(45) Date of Patent: Aug. 22, 2023

(54) IMAGE RECORDING DEVICE

(71) Applicant: BROTHER KOGYO KABUSHIKI KAISHA, Nagoya (JP)

(72) Inventors: Haruka Azechi, Nagoya (JP); Tetsuya Okuno, Nagoya (JP); Shinya Esaki, Nagoya (JP); Yushi Deura, Nagoya (JP); Shunsuke Minamikawa, Nagoya (JP); Sadaaki Miyazaki, Nagoya (JP); Tony Lee, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/486,994

(22) Filed: Sep. 28, 2021

(65) Prior Publication Data
US 2022/0011986 A1    Jan. 13, 2022

Related U.S. Application Data

(63) Continuation of application No. PCT/JP2020/013605, filed on Mar. 26, 2020.

(30) Foreign Application Priority Data

Mar. 28, 2019    (JP) .................................. 2019-063837

(51) Int. Cl.
*G06F 15/00*    (2006.01)
*G06F 1/00*    (2006.01)
(Continued)

(52) U.S. Cl.
CPC .......... *G06F 3/1204* (2013.01); *G06F 3/1236* (2013.01); *G06F 3/1238* (2013.01)

(58) Field of Classification Search
CPC ..... G06F 3/1204; G06F 3/1236; G06F 3/1238
(Continued)

(56) References Cited

U.S. PATENT DOCUMENTS

2002/0131784 A1    9/2002    Takemoto
2002/0134829 A1    9/2002    Tanaka
(Continued)

FOREIGN PATENT DOCUMENTS

| JP | 2002-278379 A | 9/2002 |
| JP | 2004-133017 A | 4/2004 |
| JP | 2008-296588 A | 12/2008 |

OTHER PUBLICATIONS

International Preliminary Report on Patentability together with the Written Opinion dated Sep. 28, 2021 from related PCT/JP2020/013605.
(Continued)

*Primary Examiner* — Mohammad H Ghayour
(74) *Attorney, Agent, or Firm* — Scully, Scott, Murphy & Presser, PC

(57) ABSTRACT

An image recording device includes a cartridge mount configured to hold a cartridge detachably, a cartridge interface, a print engine configured to execute printing, a communication interface configured to connect to a communication network connected to the Internet, memory and a controller. The controller determines whether appropriate authentication information has been obtained from a cartridge memory of the cartridge mounted in the cartridge mount through the cartridge interface, in response to determining that the appropriate authentication information has been obtained, obtains, from the cartridge memory through the cartridge interface, a destination address of an information processing device connected to the Internet, communication setting information in the communication network, and identification information, stores the obtained communication setting information in the memory to execute communication setting, and transmits transmission data including the identification information to the obtained destination
(Continued)

address through the communication interface after executing the communication setting.

9 Claims, 13 Drawing Sheets

(51) Int. Cl.
    *G06K 1/00*     (2006.01)
    *G06F 3/12*     (2006.01)

(58) Field of Classification Search
    USPC .............................. 358/1.14, 1.1, 1.15, 1.13
    See application file for complete search history.

(56) References Cited

U.S. PATENT DOCUMENTS

| | | |
|---|---|---|
| 2004/0201861 A1 | 10/2004 | Ishibashi et al. |
| 2017/0225476 A1* | 8/2017 | Ness .................... B41J 2/17503 |
| 2018/0255696 A1* | 9/2018 | Wintemute .............. A01C 7/10 |

OTHER PUBLICATIONS

International Search Report dated Jun. 16, 2020 issued in PCT/JP2020/013605.
Notice of Reasons for Refusal dated May 30, 2023 from related Japanese Patent Application JP 2019-063837 together with English language translation.

* cited by examiner

PRINTER MANAGEMENT DATABASE

| IDENTIFICATION INFORMATION | | PRINTING CONDITION | | | | TRANSMISSION TYPE INFORMATION | | | | | MANAGEMENT INFORMATION |
|---|---|---|---|---|---|---|---|---|---|---|---|
| USER IDENTIFICATION INFORMATION | NODE ID | SHEET SIZE | NUMBER OF PRINTING (PER DAY) | COLOR/ MONOCHROME | ... | REMAINING AMOUNT | INK LOW | INK EMPTY | SHEET JAM | ... | |
| AAA | ADK083 | A4 | 100 | MONOCHROME | ... | ON | ON | ON | ON | ... | |
| AAA | AFC021 | FREE | FREE | FREE | ... | ON | ON | ON | ON | ... | |
| AAA | AML045 | A4/A5 | 200 | COLOR | ... | ON | ON | ON | OFF | ... | |
| ... | | | | | | | | | | | |
| BBB | CKL001 | A4 | FREE | COLOR | ... | ON | ON | OFF | OFF | ... | |
| ... | | | | | | | | | | | |

MANAGEMENT INFORMATION

| CURRENT REMAINING AMOUNT | | | | CUMULATIVE SUM OF PRINTED SHEETS | CARTRIDGE REPLACEMENT COUNT | | | | CLEANING COUNT | | | SHEET JAM COUNT | CARTRIDGE SHIPMENT INFORMATION | | | |
|---|---|---|---|---|---|---|---|---|---|---|---|---|---|---|---|---|
| M | C | Y | Bk | | M | C | Y | Bk | MCY | Bk | ALL | | M | C | Y | Bk |
| 30 | 25 | 5 | 45 | 1230 | 6 | 7 | 8 | 15 | 3 | 5 | 30 | 5 | – | – | 2019.03.15 | – |
| | | | | | | | | | | | | | ... | ... | ... | ... |

FIG. 4

COMMUNICATION MANAGEMENT DATABASE

| NODE ID | TYPE | IP ADDRESS | LOCATION INFORMATION | GROUP |
|---|---|---|---|---|
| ABC012 | MANAGEMENT PC | 192.169.1.2 | SYSTEM MANAGEMENT DEPARTMENT | A |
| ACD038 | PC | 192.169.1.3 | SYSTEM MANAGEMENT DEPARTMENT | A |
| ADK083 | PRINTER | 192.169.1.4 | SYSTEM MANAGEMENT DEPARTMENT | D |
| ⋮ | ⋮ | ⋮ | ⋮ | ⋮ |
| — | — | 192.169.1.20 | SYSTEM MANAGEMENT DEPARTMENT | A |
| ⋮ | ⋮ | ⋮ | ⋮ | ⋮ |
| AFC021 | PC | 192.169.1.31 | DEVELOPMENT DEPARTMENT | B |
| APC078 | PRINTER | 192.169.1.32 | DEVELOPMENT DEPARTMENT | D |
| ⋮ | ⋮ | ⋮ | ⋮ | ⋮ |
| — | — | 192.169.1.38 | DEVELOPMENT DEPARTMENT | B |
| ⋮ | ⋮ | ⋮ | ⋮ | ⋮ |
| ALQ065 | PC | 192.169.1.41 | PLANNING DEPARTMENT | C |
| ANL045 | PRINTER | 192.169.1.42 | PLANNING DEPARTMENT | D |
| ⋮ | ⋮ | ⋮ | ⋮ | ⋮ |

FIG. 5A

| GROUP | INFORMATION PROCESSING DEVICE | SERVER A | ... | FREE CONNECTION | PERMITTED TIME OF DAY | PERMITTED COMMUNICATION VOLUME |
|---|---|---|---|---|---|---|
| A | PERMITTED | PERMITTED | ... | PERMITTED | FREE | FREE |
| B | NOT PERMITTED | PERMITTED | ... | NOT PERMITTED | 8-23 O' CLOCK | 200 |
| C | NOT PERMITTED | NOT PERMITTED | ... | NOT PERMITTED | 8-21 O' CLOCK | 300 |
| D | PERMITTED | NOT PERMITTED | ... | NOT PERMITTED | FREE | 100 |

FIG. 5B

IMAGE RECORDING DEVICE

CROSS-REFERENCE TO RELATED APPLICATIONS

This is a Continuation Application of International Application No. PCT/JP2020/013605 filed on Mar. 26, 2020, which claims priority from Japanese Patent Application No. 2019-063837 filed on Mar. 28, 2019. The entire disclosures of the prior applications are incorporated herein by reference.

BACKGROUND

Technical Field

Aspects of the present disclosure relate to a technique in which an image recording device communicates with an information processing device of a service provider based on a contract between the service provider and a user.

Related Art

There has been known a technique in which a personal computer connected to an image recording device using a bidirectional parallel cable communicates with a server via the Internet. The personal computer implements a printer driver and a browser. The printer driver obtains an address of a homepage disclosed by a server from a memory of a cartridge mounted on the image recording device. The printer driver communicates with the server using the obtained address and the browser.

SUMMARY

There are several ways to connect an image recording device to the Internet. One is to connect an image recording device to a personal computer connected to the Internet in a one-to-one correspondence using a serial or parallel cable. Another is to connect an image recording device to a local communication network such as a LAN (Local Area Network) or a WAN (Wide Area Network) connected to the Internet.

When an image recording device is connected to a personal computer connected to the Internet in a one-to-one correspondence using a serial or parallel cable, communication with external devices on the Internet is performed by the personal computer. In this case, the image recording device is not used to perform communication setting related to Internet access. That is, in the above-described technique, the image recording device is not used to perform communication setting related to Internet access.

However, when an image recording device is connected to a local communication network such as a LAN or a WAN connected to the Internet, various communication settings may be used to allow the image recording device to communicate with a server of a service provider. The local communication network is connected to the Internet via a gateway device such as a router. A host computer implementing a management program of the gateway device is connected to the communication network. An administrator of the communication network registers, on the management program, communication settings of nodes such as a personal computer and an image recording device connected to the communication network. For example, the administrator registers a node ID such as a MAC address and a set private IP address in association with each other by using the management program. The administrator may register the private IP address in association with permission conditions, restriction conditions and location information. The permission conditions and the restriction conditions are, for example, a communication time of day, a communication amount, a communication target device, a communication target network name and the like in which communication is to be permitted or restricted. The location information is, for example, an installation location or a department name of the node.

When an image recording device is connected to a local communication network, in order for the image recording device to communicate with the server of the service provider, it is necessary to input and set communication settings such as a private IP address associated with appropriate permission conditions, restriction conditions and location information to the image recording device. However, an input interface such as a user interface (UI) or a touch panel for receiving an input on the image recording device is generally inferior in function to a UI or an input interface mounted on a personal computer. That is, it takes time and effort to input the communication settings to the image recording device.

According to aspects of the present disclosure, there is provided an image recording device including a cartridge mount configured to hold a cartridge detachably, a cartridge interface, a print engine configured to execute printing, a communication interface connectable to a communication network connected to the Internet, memory and a controller. The controller is configured to determine whether appropriate authentication information has been obtained from a cartridge memory of the cartridge mounted in the cartridge mount through the cartridge interface, in response to determining that the appropriate authentication information has been obtained, obtain, from the cartridge memory through the cartridge interface, a destination address of an information processing device connected to the Internet, communication setting information in the communication network, and identification information, store the obtained communication setting information in the memory to execute communication setting, and transmit transmission data including the identification information to the obtained destination address through the communication interface after executing the communication setting.

According to aspects of the present disclosure, there is further provided an image recording device including a cartridge mount configured to hold a plurality of cartridges detachably, a cartridge interface, a print engine configured to execute printing, a communication interface connectable to a communication network connected to the Internet, memory, and a controller. The controller is configured to: obtain type information from a cartridge memory of each cartridge mounted in the cartridge mount through the cartridge interface; determine whether the type information indicates a contract usage mode or a normal usage mode; in response to determining that the type information indicates the contract usage mode, obtain, from the cartridge memory through the cartridge interface, a destination address of an information processing device connected to the Internet, a specific IP address of the image recording device in the communication network, and identification information of the image recording device in the communication network; store the obtained specific IP address in the memory; and transmit transmission data including the identification information to the obtained destination address through the communication interface after storing the obtained specific IP address in the memory.

BRIEF DESCRIPTION OF THE ACCOMPANYING DRAWINGS

FIG. 4 is a diagram illustrating a printer management database managed by the information processing device.

FIG. 5A is a diagram illustrating a communication management database managed by the management computer.

FIG. 5B is a diagram illustrating a sub-database of the communication management database.

DETAILED DESCRIPTION

Figure 1:
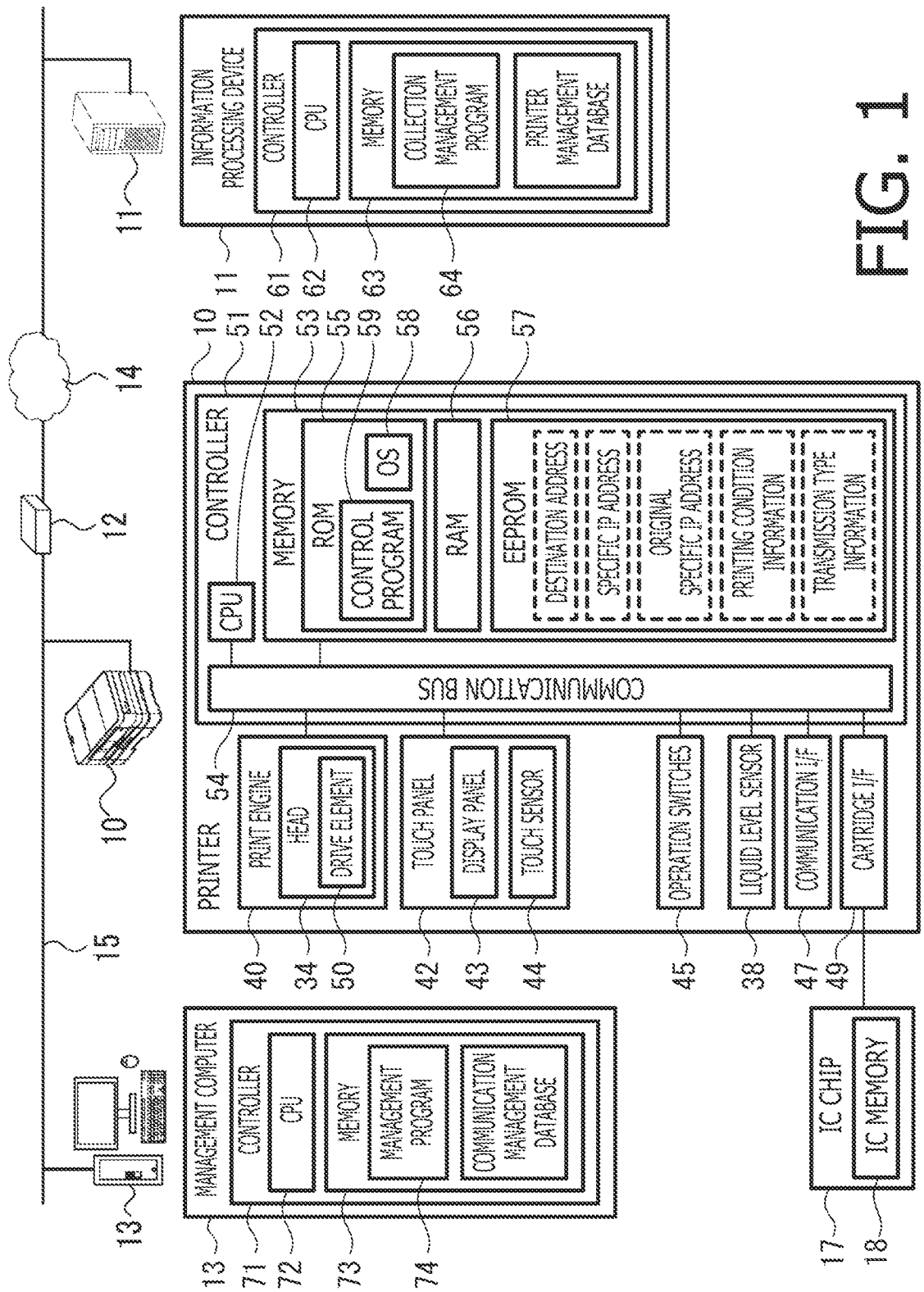
FIG. 1 is a functional block diagram of a management computer, a printer, and an information processing device.

Hereinafter, embodiments of the present disclosure will be described. It is noted that the embodiments described below are merely examples of the present disclosure, and it goes without saying that the embodiments of the present disclosure can be modified appropriately without changing the scope of the present disclosure.

In the present embodiment, a printer 10 illustrated in FIG. 1 will be described. The printer 10 is connected to a LAN 15 which is a wired LAN or a wireless LAN. In addition to the printer 10, a management computer 13, one or more terminal devices such as personal computers, and a router 12 are connected to the LAN 15. A communication system including the management computer 13, the terminal devices, the router 12 and the LAN 15 is managed by a system administrator. That is, the printer 10 of the present embodiment is managed together with other terminal devices by the system administrator. It should be noted that the communication network may be the one that uses a unique communication protocol in addition to a communication protocol such as TCP/IP used in the LAN 15. That is, the type of the communication network is not limited to the LAN. The communication network may also be a wide area network (WAN) in which a plurality of local networks are connected.

The router 12 is connected to the Internet 14. That is, the communication system is connected to an external network via the router 12.

The system administrator manages the communication system by using the management computer 13. Specifically, the system administrator registers an overall communication setting to the router 12 by using the management computer 13. The router 12 mediates communication between the terminal devices or the printer 10 connected to the LAN 15 and one or more external devices on the Internet 14 based on the registered overall communication setting.

An information processing device 11 which is owned by the system administrator or which the system administrator is authorized to use is connected to the Internet 14. The printer 10 transmits information on, for example, remaining amounts of consumables to the information processing device 11 via the router 12 and the Internet 14. The information processing device 11 manages information transmitted by the printer 10. The system administrator monitors, for example, the remaining amounts of consumables in the printer 10 based on the information transmitted by the printer 10, and provides the user with services such as shipment of consumables to the user. That is, the system administrator is also a service provider that provides services to the user using the printer 10.

The printer 10 has a function of obtaining a communication setting corresponding to the above-described overall communication setting registered to the router 12 from a later-described cartridge 16 (FIG. 2) and performing its own communication setting. With this function, the printer 10 reduces the trouble of the system administrator manually inputting the communication setting to the printer 10. This will be described in detail below. Although FIG. 1 illustrates an example in which only one printer 10 is connected, a plurality of printers 10 may be connected.

The management computer 13 is a personal computer or a server. The management computer 13 includes a controller 71 and a display, a user OF and a communication I/F. "I/F" stands for interface. The user OF is a keyboard or a mouse. The communication I/F transmits and receives information and/or data in accordance with a communication protocol defined in the LAN 15. The controller 71 includes a CPU 72 and a memory 73. The memory 73 is, for example, a ROM, a RAM or a hard disk. The memory 73 stores an operating system (OS) and a management program 74. The management program 74 is a program for registering the overall communication setting to the router 12 and managing the communication system. The memory 73 stores a communication management database for managing the overall communication setting registered to the router 12. The system administrator registers various settings in the communication management database via the user I/F.

FIG. 5A illustrates an example of the communication management database. The communication management database includes a plurality of items and a plurality of records. One record is generated for one node. The node is a terminal device such as a personal computer or the printer 10. The plurality of items include "NODE ID," "TYPE," "IP ADDRESS," "LOCATION INFORMATION," and "GROUP." The item "NODE ID" is information that makes it possible to individually identify a node, such as a MAC address or a serial number. The node ID may be a private ID assigned to each node by the system administrator. The item "TYPE" indicates a type of the node. The "MANAGEMENT PC" in the illustrated example indicates the management computer 13. The "PC" indicates a personal computer. The "PRINTER" indicates the printer 10.

The item "IP ADDRESS" indicates a private IP address set for each node in LAN 15. One IP address is assigned to one node. In the illustrated example, an IP address "192.168.1.3" is assigned to a personal computer having a node ID "ACD038," and an IP address "192.168.1.4" is assigned to the printer 10 having a node ID "ADK083". By inputting the IP address "192.168.1.3" to the personal computer having the node ID "ACD038", the personal computer is recognized by the router 12. That is, the personal computer becomes able to communicate with other nodes connected to the LAN 15 and external devices connected to the Internet 14. Similarly, by inputting the IP address "192.168.1.4" to the printer 10 having the node ID "ADK083", the printer 10 is recognized by the router 12 and becomes able to communicate with other nodes connected to the LAN 15 and external devices connected to the Internet 14. It is noted that IP addresses "192.168.1.20" and "192.168.1.38" are not associated with nodes. These IP addresses are used, for example, when nodes are added or when the nodes are caused to temporarily use the IP addresses.

The item "LOCATION INFORMATION" indicates a place where the node is installed, such as "FIRST FLOOR" or "SECOND FLOOR," a department name to which the node belongs, such as "SYSTEM MANAGEMENT DEPARTMENT," "DEVELOPMENT DEPARTMENT" or "PLANNING DEPARTMENT." The item "GROUP" indicates a group to which each node belongs. In the illustrated example, the printer 10 belongs to a group "D." However, grouping may be made by department such that all nodes belonging to the location information "SYSTEM MANAGEMENT DEPARTMENT" belong to the same group, and all nodes belonging to the location information "DEVELOPMENT DEPARTMENT" belong to another same group.

FIG. 5B illustrates a sub-database of the communication management database. The sub-database includes a plurality of items and a plurality of records. One record is generated for one group. The item "INFORMATION PROCESSING DEVICE" indicates whether communication with the information processing device 11 of the system administrator is permitted. The item "SERVER A" indicates whether communication with a server A which is an external device is permitted. The item "FREE CONNECTION" indicates whether to restrict communication with an external device. The "PERMITTED" in the item "FREE CONNECTION" indicates that the communication with an external device is not restricted. The item "PERMITTED TIME OF DAY" indicates time of day in which communication with an external device is permitted. The item "PERMITTED COMMUNICATION VOLUME" indicates an upper limit of a communication volume for transmitting data to an external device or a communication volume for receiving data from the external device. For example, a personal computer belonging to the system management department belongs to the group "A," and is permitted to communicate with an external device without restriction and without being restricted in terms of the time of day or the communication volume. All the printers 10 belong to the group "D", and are permitted to communicate with the information processing device 11 in order to transmit information on the remaining amounts of consumables or the like, but are restricted from communicating with other external devices including the server A. The printers 10 are permitted to communicate with the information processing device 11 without being restricted in term of the time of day so as to transmit information immediately to the information processing device 11 if a failure occurs. Furthermore, since the printers 10 only have to transmit the remaining amount values indicating the remaining amounts and the like to the information processing device 11, the printers 10 have an upper limit of the permitted communication volume that is set to be lower than that of any other node. Pieces of information indicated by the items "SERVER A", "FREE CONNECTION", "PERMITTED TIME OF DAY", and "PERMITTED COMMUNICATION VOLUME" in the sub-database are restriction information or permission information for restricting or permitting communication by the node.

Next, the information processing device 11 used by the system administrator will be described. The information processing device 11 is, for example, a web server that discloses a URL on the Internet 14. The information processing device 11 includes a controller 61, a display, a user I/F, and a communication I/F. Configurations of the display, the user I/F and the communication I/F are the same as those of the management computer 13. The controller 61 includes a CPU 62 and a memory 63. The memory 63 is, for example, a ROM, a RAM or a hard disk. The memory 63 stores an OS and a collection management program 64. The collection management program 64 is a program for managing information transmitted by the printers 10. The memory 63 also stores a printer management database for managing information transmitted by the printers 10.

The printer management database will be described with reference to FIG. 4. The printer management database includes a plurality of items and a plurality of records. One record is generated for one printer 10. The plurality of items are items such as "IDENTIFICATION INFORMATION," "PRINTING CONDITION," "TRANSMISSION TYPE INFORMATION" and "MANAGEMENT INFORMATION." The item "IDENTIFICATION INFORMATION" has two sub-items. One sub-item "USER IDENTIFICATION INFORMATION" is information for identifying a user and is, for example, a user ID assigned to the user by the system administrator. The other sub-item "node ID" is the same as the "node ID" in the communication management database.

The item "PRINTING CONDITION" indicates printing conditions permitted for the printer 10. The item "PRINTING CONDITION" includes a plurality of sub-items. A sub-item "SHEET SIZE" indicates a sheet size permitted for the printer 10. In the illustrated example, a printer 10 identified by the identification information "AAA ADK083" is permitted to print only the sheet size of A4. A sub-item "PRINTING COUNT (PER DAY)" indicates the number of sheets allowed to be printed in one day. In the illustrated example, the printer 10 identified by the identification information "AAA ADK083" is permitted to print up to 100 sheets per day. A sub-item "COLOR/MONOCHROME" indicates whether to permit only monochrome printing, only color printing, or both. In the illustrated example, the printer 10 identified by the identification information "AAA ADK083" is permitted to perform only monochrome printing. It is noted that the item "PRINTING CONDITION" may further include sub-items other than the illustrated examples.

The item "TRANSMISSION TYPE INFORMATION" indicates types of information the printer 10 is caused to transmit. The item "TRANSMISSION TYPE INFORMATION" includes a plurality of sub-items. In a sub-item "REMAINING AMOUNT", "ON" indicates that the printer 10 is caused to transmit the remaining amount values. In a sub-item "INK LOW", "ON" indicates that the printer 10 is caused to transmit information indicating that a remaining amount of ink stored in a later-described cartridge 16 mounted in the printer 10 has become small. In a sub-item "INK EMPTY", "ON" indicates that the printer 10 is caused to transmit information indicating that ink stored in a cartridge 16 has been used up. In a sub-item "SHEET JAM", "ON" indicates that, when a sheet jam occurs in the printer 10, the printer 10 is caused to transmit information indicating the sheet jam. It is noted that the item "TRANSMISSION TYPE INFORMATION" may further include sub-items other than the illustrated examples.

The item "MANAGEMENT INFORMATION" indicates information transmitted by a printer 10. That is, the information transmitted by the printer 10 is registered in the item "MANAGEMENT INFORMATION." As will be described in detail later, the collection management program 64 specifies a record having the identification information that matches the identification information included in a request transmitted by the printer 10, and registers the information included in the received request in the item "MANAGEMENT INFORMATION" of the specified record. The item "MANAGEMENT INFORMATION" includes a plurality of sub-items. In a sub-item "CURRENT REMAINING AMOUNT," the latest remaining amount values transmitted by the printer 10 are registered. The sub-item "CURRENT REMAINING AMOUNT" includes four sub-items. Each of the four sub-items indicates the color of ink stored in the cartridge 16. The sub-items "M", "C", "Y", and "Bk" indicate the colors of magenta, cyan, yellow, and black, respectively. In a sub-item "CUMULATIVE SUM OF PRINTED SHEETS," a total number of sheets that has been printed by the printer 10 so far is registered. In a sub-item "CARTRIDGE REPLACEMENT COUNT," the number of times each cartridge 16 has been replaced in the printer 10 is registered. The sub-item "CARTRIDGE REPLACEMENT COUNT" includes a plurality of sub-items "M," "C," "Y," and "Bk." In a sub-item "CLEANING COUNT," the number of times of cleaning performed in the printer 10 is registered. The cleaning means cleaning nozzles of a later-described head 34 of the printer 10 by sucking ink from the nozzles of the head 34. The sub-item "CLEANING COUNT" includes a plurality of sub-items. In a sub-item "CMY," the number of times cleaning has been performed for magenta, cyan, and yellow inks in the printer 10 is registered. In a sub-item "Bk", the number of times cleaning has been performed for black ink in the printer 10 is registered. In a sub-item "ALL," the number of times cleaning has been performed for inks of all colors in the printer 10 is registered. It is noted that the printer 10 has a function of sucking ink from nozzles that eject magenta, cyan, and yellow inks only, a function of sucking ink from nozzles that eject black ink only, and a function of sucking ink from all the nozzles. That is, the printer 10 can separately suck the magenta, cyan, and yellow inks and the black ink, or can collectively suck the inks of all the colors. In an item "SHEET JAM COUNT," the number of sheet jams occurred in the printer 10 is registered. In an item "CARTRIDGE SHIPMENT INFORMATION," the date of shipment of a cartridge 16 is registered if the cartridge 16 has been shipped. The item "CARTRIDGE SHIPMENT INFORMATION" is registered by the system administrator, for example, in response to the system administrator arranging the shipment of the cartridge 16. The item "CARTRIDGE SHIPMENT INFORMATION" includes a plurality of sub-items "M," "C," "Y" and "Bk." It is noted that the shipment date registered in the item "CARTRIDGE SHIPMENT INFORMATION" is reset when the request transmitted by the printer 10 includes replacement information indicating that the cartridge 16 has been replaced. In the figure, "-" indicates a reset state. The item "MANAGEMENT INFORMATION" may further include sub-items other than the illustrated example.

The printer management database may further include items other than the item "PRINTING CONDITION," the item "TRANSMISSION TYPE INFORMATION" and the item "MANAGEMENT INFORMATION." For example, the printer management database may further include an item "TRANSMISSION TIMING." The item "TRANSMISSION TIMING" includes sub-items such as "NORMAL," "INK LOW," "INK EMPTY," and "SHEET JAM." In a sub-item "NORMAL," a transmission timing at which the printer 10 transmits information including the remaining amount value is registered when ink low, ink empty, or sheet jam is not occurring. For example, a period such as "12 hours," "24 hours" or "2 days" is registered in the sub-item "NORMAL" by the system administrator. In the sub-item "INK LOW," a transmission timing at which the printer 10 transmits information including the remaining amount value when ink low occurs is registered. In the sub-item "INK EMPTY," a transmission timing for transmitting information indicating that the cartridge 16 has been replaced in the printer 10 when ink empty occurs is registered. In a sub-item "SHEET JAM," a transmission timing for transmitting information indicating that a sheet jam has been cleared in the printer 10 is registered.

Next, the printer 10 will be described with reference to FIGS. 1 to 3. The printer 10 may be a dedicated printer that is used only in a mode in which the user uses the printer by making a contract with the system administrator, or may be a general-purpose printer that is used regardless of whether the user makes a contract with the system administrator. Hereinafter, an example in which the printer 10 is a general-purpose printer will be described. In the following description, a mode in which the user uses the printer 10 while making a contract with the system administrator will be referred to as a contract usage mode, and a mode in which the user uses the printer 10 without making a contract with the system administrator will be referred to as a normal usage mode.

Figure 2A:
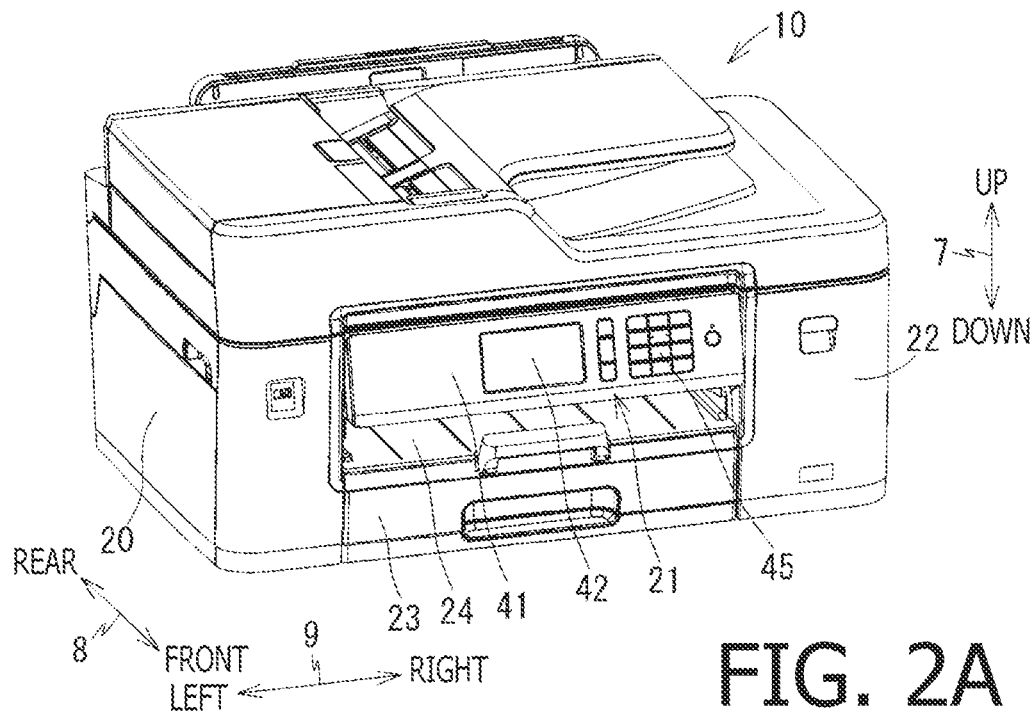
FIG. 2A is a perspective view of the printer with a cover closed.
Figure 2B:
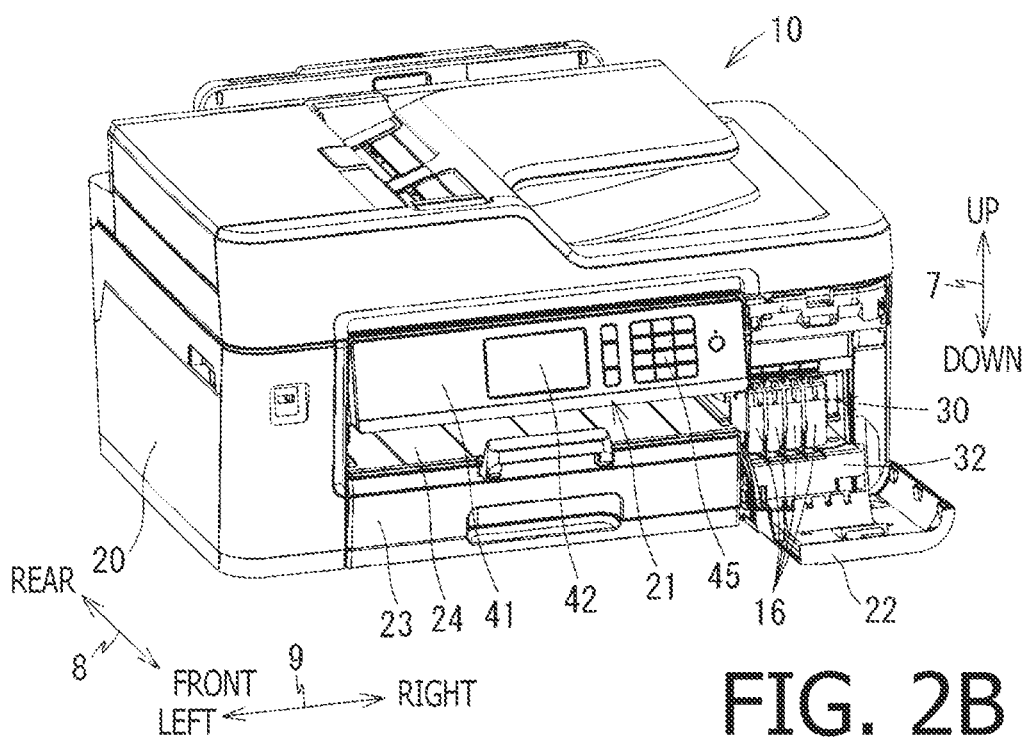
FIG. 2B is a perspective view of the printer with the cover opened.
Figure 3:
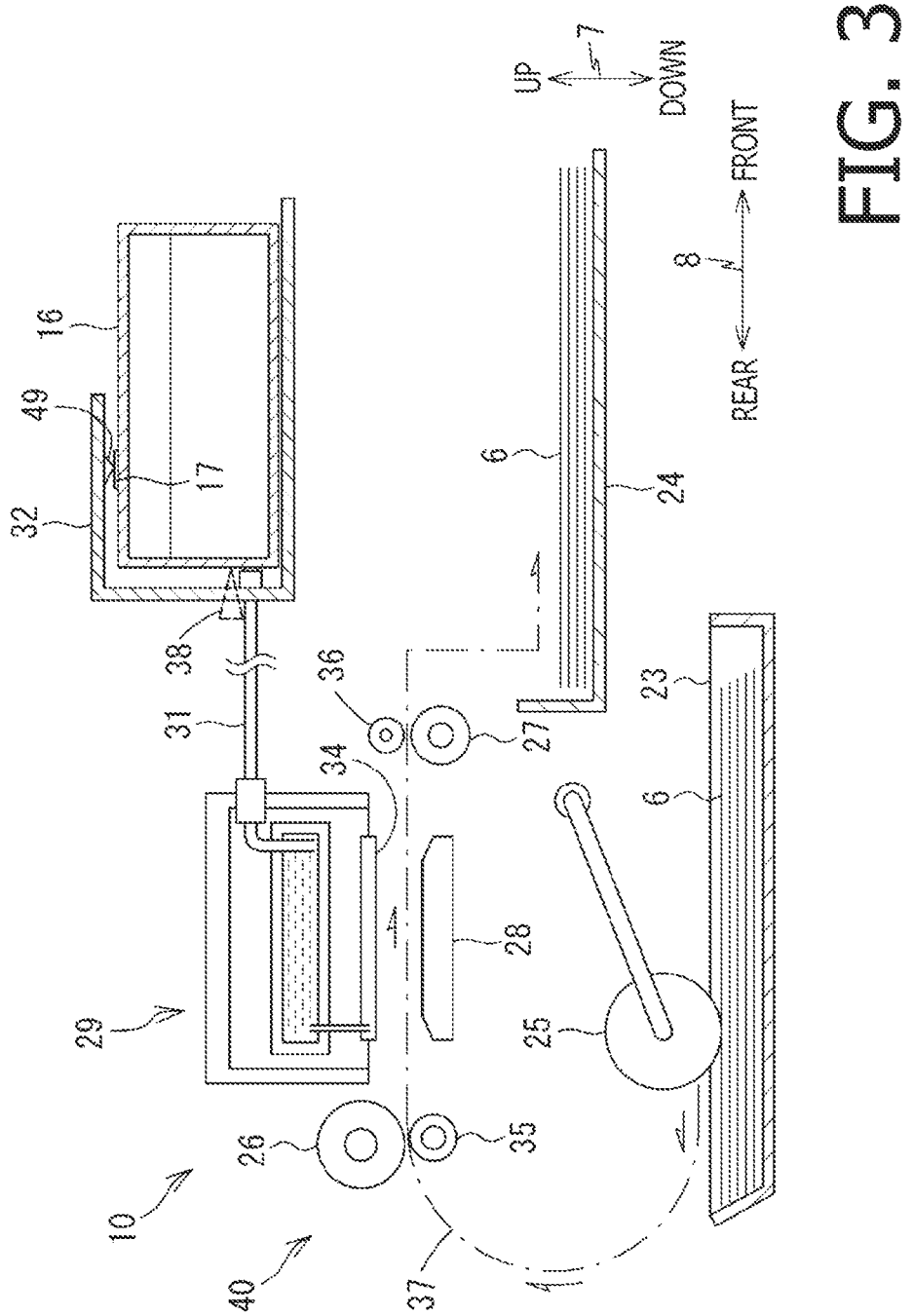
FIG. 3 is a schematic cross-sectional view of the printer.

As shown in FIG. 2, the printer 10 includes a housing 20, and a panel assembly 21, a cover 22, a sheet feed tray 23 and a sheet discharge tray 24 that are held by the housing 20.

The panel assembly 21 includes a panel body 41, and a touch panel 42 and a plurality of operation switches 45 held by the panel body 41. The panel body 41 has a rectangular plate shape and is attached to one surface of the housing 20. In the following description, in a state in which the printer 10 is placed on a horizontal surface, a front-rear direction 8 is defined with one surface of the housing 20 on which the panel body 41 is placed as a front surface, and a direction along a vertical direction is defined as an up-down direction 7. Further, the left and right when the printer 10 is viewed from the front are defined as a left-right direction 9. The front-rear direction 8 and the left-right direction 9 are parallel to the horizontal surface, are orthogonal to the up-down direction 7, and are orthogonal to each other.

As shown in FIG. 1, the touch panel 42 has a display panel 43 that displays an image, and a transparent film-shaped touch sensor 44 that is superimposed on the display panel 43. The touch sensor 44 outputs position information indicating a position on the display panel 43 touched by the user. The position information is, for example, coordinates (x, y) on the x-y plane when the upper left end of the display panel 43 is set as the origin, the right direction is set as the positive direction of the x-axis, and the downward direction is set as the positive direction of the y-axis.

The display panel 43 and the touch sensor 44 of the touch panel 42 are connected to a controller 51 described later by a cable or the like. The controller 51 outputs image data to the display panel 43 to cause the display panel 43 to display an image. The controller 51 also receives the position information output from the touch sensor 44. The controller 51 determines an object such as an icon displayed at the position indicated by the position information input from the touch sensor 44 as an object selected by the user.

Each operation switch 45 has a contact that is opened or closed in accordance with a user operation. The operation switch 45 outputs a voltage value that varies depending on whether the contact is opened or closed. The operation switch 45 is connected to the controller 51 by a cable or the like. The controller 51 determines whether the operation switch 45 has been operated by the user based on the voltage value input from the operation switch. It is noted that only one of either the touch sensor 44 or the operation switches 45 may be provided to the panel assembly 21.

As shown in FIG. 2, the sheet feed tray 23 is located at a lower portion of the housing 20 and is detachably held by the housing 20. The sheet discharge tray 24 is located at a lower portion of the housing 20 and above the sheet feed tray 23, and is held by the sheet feed tray 23 or the housing 20. The cover 22 is positioned at the right portion of the front surface of the housing 20 and is rotatably held by the housing 20. The cover 22 rotates between a closed position at which the cover 22 closes an opening 30 provided at the right portion of the housing 20 and an open position at which the cover 22 opens the opening 30. A mounting case 32 is disposed behind the opening 30 and held by the housing 20. The mounting case 32 has a configuration of detachably holding the cartridges 16. Since this configuration is well known, detailed description thereof will be omitted.

The mounting case 32 detachably holds the plurality of cartridges 16. In the illustrated example, the mounting case 32 detachably holds four cartridges 16. Each of the four cartridges 16 stores, for example, ink of one of magenta, cyan, yellow, and black colors. That is, the printer 10 is a so-called inkjet printer and is a so-called color printer. However, the mounting case 32 may detachably hold only one cartridge 16 storing ink of black color. That is, the printer 10 may be a so-called monochrome printer. The mounting case 32 may detachably hold one or more cartridges 16 each containing toner instead of ink. That is, the printer 10 may be a so-called laser printer.

The mounting case 32 has a cartridge I/F 49 shown in FIG. 1. The cartridge I/F 49 includes, for example, terminals each corresponding to one of the cartridges 16. The cartridge I/F 49 is disposed at a position where each terminal contacts an electrode of an IC chip 17 (FIG. 1) of a corresponding cartridge 16 mounted in the mounting case 32. The cartridge I/F 49 is connected to the controller 51 described later by a cable.

It is noted that the cartridge I/F 49 may be an antenna. For example, as the cartridge I/F 49, a substrate having a pattern antenna is disposed in the mounting case 32. The IC chip 17 has a similar antenna. The cartridge I/F 49 outputs radio wave to be received by the antenna of the IC chip 17 and the antenna of the IC chip 17 receives the output radio wave. That is, the cartridge I/F 49 receives information or data from the IC chip 17 and transmits information or data to the IC chip 17 by way of radio wave.

The cartridge I/F 49 may also be a light emitting diode and a photodiode. For example, as the cartridge I/F 49, a substrate having a light emitting diode and a photodiode is disposed in the mounting case 32. The IC chip 17 includes a similar light emitting diode and photodiode. The cartridge I/F 49 emits light to be received by the photodiode of the IC chip 17 and receives light emitted by the light-emitting diode of the IC chip 17. That is, the cartridge I/F 49 may receive information or data from the IC chip 17 and transmit information or data to the IC chip 17 by way of light.

A liquid level sensor 38 is provided to the mounting case 32. The liquid level sensor 38 is, for example, a photo interrupter having a light emitting diode and a photodiode. The liquid level sensor 38 is provided such that the cartridge 16 mounted in the mounting case 32 is positioned on an optical path between the light emitting diode and the photodiode. The cartridge 16 has a light-transmitting property at a portion positioned on the optical path. For example, the cartridge 16 is manufactured by using a resin molded product having a light-transmitting property in at least a part of the cartridge 16.

The liquid level sensor 38 is positioned such that the above-described optical path is between an upper end and a lower end of the cartridge 16 in the up-down direction 7. In the illustrated example, the optical path of the liquid level sensor 38 is positioned below an intermediate position between the upper end and the lower end of the cartridge 16 in the up-down direction 7. The liquid level sensor 38 outputs a first detection signal when ink is on the optical path, and outputs a second detection signal different from the first detection signal when ink is not on the optical path. In the following description, the position of the optical path of the liquid level sensor 38 is referred to as a "detection position."

The liquid level sensor 38 is connected to the controller 51 using a cable or the like. That is, the first detection signal and the second detection signal output from the liquid level sensor 38 are input to the controller 51. The controller 51 determines whether a liquid level of the ink stored in the cartridge 16 mounted in the mounting case 32 has reached the detection position based on whether the signal input from the liquid level sensor 38 is the first detection signal or the second detection signal. Details will be described later.

The cartridge 16 has a box shape having an internal space for storing ink. Since the basic configuration of the cartridge 16 is well known, detailed description thereof will be omitted. The cartridge 16 includes the IC chip 17. In the illustrated example, the IC chip 17 is attached to an upper surface of the cartridge 16. The IC chip 17 has an electrode that contacts the cartridge I/F 49, which is a terminal, and an IC memory 18 electrically connected to the electrode. Alternatively, the IC chip 17 has an antenna such as a pattern antenna, or a light emitting diode and a photodiode in place of the electrode. The IC memory 18 stores various information. Specifically, the IC memory 18 stores a model number, type information, an initial storing amount value, a CTG serial number, the user identification information, a destination address, a specific IP address, printing condition information and the transmission type information.

The model number is identification information assigned to the cartridge 16 in accordance with the color of ink stored in the cartridge 16 and the type of ink such as dye or pigment. The type information is information indicating whether the cartridge 16 is a cartridge be to be used in the contract usage mode or a cartridge to be used in the normal usage mode. For example, the type information is 1-bit data that is stored at a predetermined address of the IC memory 18 and that indicates "0" or "1." For example, "1" indicates that the cartridge is to be used in the contract usage mode, and "0" indicates that the cartridge is used in the normal usage mode. However, the type information may be included in the model number. That is, one model number may indicate the color and type of one ink and whether the ink is to be used in the normal usage mode or the contract usage mode. It is noted that, in a case where the printer 10 is a dedicated printer for use only in the contract usage mode, the type information is not stored in the IC memory 18.

The initial storing amount value indicates an initial amount of ink stored in the cartridge 16. The initial storing amount value is used for calculation of the remaining amount of ink in the cartridge 16 and the like by the controller 51. The serial number is a number for identifying each cartridge 16. The serial number is used by the controller 51 to determine whether the cartridge 16 has been replaced. For example, in response to the serial number obtained from the IC memory 18 not matching the serial number stored in memory 53, the controller 51 described later determines that the cartridge 16 has been replaced. Details will be described later.

The user identification information is information assigned to the user by the system administrator, and is the same as the "USER IDENTIFICATION INFORMATION" in the printer management database described above. The destination address is a URL disclosed by the information processing device 11 or an IP address of the information processing device 11. The specific IP address is an IP address assigned to the printer 10 in the communication management database. For example, the IP address "192.168.1.4" is stored in the IC memory 18 as the specific IP address. The cartridge 16 having the IC memory 18 storing the IP address "192.168.1.4" is mounted to the printer 10 indicated by the node ID "ADK083" associated with the IP address "192.168.1.4" in the communication management database (FIG. 5A).

The printing condition information is information corresponding to the item "PRINTING CONDITION" of the printer management database (FIG. 4). The printing condition information indicates a printing condition permitted for the printer 10. Specifically, a print engine 40 executes printing on the printing condition. For example, the IC memory 18 of the cartridge 16 mounted in the mounting case 32 of the printer 10 indicated by the node ID "ADK083" stores the printing condition information indicating the sheet size "A4," the printing count "100," and "monochrome." The transmission type information is information corresponding to the item "TRANSMISSION TYPE INFORMATION" of the printer management database (FIG. 4). The transmission type information indicates information the printer 10 is caused to transmit. For example, the IC memory 18 of the cartridge 16 mounted in the mounting case 32 of the printer 10 indicated by the node ID "ADK083" stores the transmission type information indicating the remaining amount "ON," the ink low "ON," the ink empty "ON" and the sheet jam "ON."

The destination address, the specific IP address, the printing condition information and the transmission type information stored in the IC memory 18 of the cartridge 16 are stored in an EEPROM 57 of the memory 53 described later of the printer 10. A later-described controller 51 of the printer 10 executes printing in accordance with the printing condition stored in the EEPROM 57, and transmits information such as the remaining amount values indicated by the transmission type information to the information processing device 11 indicated by the destination address using the specific IP address. Details will be described later. It is noted that the destination address and the specific IP address are stored in the IC memory 18 by using a terminal device capable of storing information and data in the IC memory 18. The terminal device may be a printer 10. In this case, the system administrator owns a printer 10 having the same specification as the printer 10 provided to the user, and uses his/her own printer 10 to store a destination address and a specific IP address in an IC memory 18 of a cartridge 16.

The housing 20 holds the print engine 40 therein. The print engine 40 mainly includes a sheet feed roller 25, a conveying roller 26, a discharge roller 27, a platen 28, and a recording unit 29. The sheet feed roller 25 is held by a frame provided in the housing 20 so as to be able to contact a sheet 6 placed on the sheet feed tray 23. The sheet feed roller 25 is rotated by a motor. The rotating sheet feed roller 25 feeds the sheet 6 to a conveyance path 37. The conveyance path 37 is a space defined by a guide member. In the illustrated example, the conveyance path 37 extends in a curved manner from a rear end of the sheet feed tray 23 to a position above the sheet feed tray 23, and then extends forward.

The conveying roller 26 is located downstream of the sheet feed tray 23 in a conveying direction of the sheet 6. The conveying roller 26 and a driven roller 35 constitute a roller pair. The conveying roller 26 is rotated by a motor. The rotating conveying roller 26 and driven roller 35 convey the sheet 6 fed to the conveyance path 37 by the sheet feed roller 25 while nipping the sheet 6. The discharge roller 27 is located downstream of the conveying roller 26 in the conveying direction of the sheet 6. The discharge roller 27 and a driven roller 36 constitute a roller pair. The discharge roller 27 is rotated by a motor. The rotating discharge roller 27 and driven roller 36 convey the sheet 6 while nipping the sheet 6, and discharge the sheet 6 on the sheet discharge tray 24. The platen 28 is located between the conveying roller 26 and the discharge roller 27 in the front-rear direction 8, and downstream of the conveying roller 26 and upstream of the discharge roller 27 in the conveying direction of the sheet 6.

The recording unit 29 is located above the platen 28. The recording unit 29 may be held by a guide rail that is a part of the frame so as to be movable in the left-right direction 9 (FIG. 2), or may be fixed to the frame. That is, the printer may be a so-called serial printer or a so-called line printer. The recording unit 29 has a head 34. The head 34 has channels therein through which ink flows. The channels communicate with the internal space of the cartridge 16 mounted in the mounting case 32 via a tube 31. That is, the ink stored in the cartridge 16 is supplied to the head 34 through the tube 31.

As shown in FIG. 1, the head 34 has a drive element 50. A portion of the drive element 50 constitutes a channel inside the head 34. The drive element 50 is electrically connected to the controller 51 by a cable or the like. The drive element 50 is a piezoelectric element or a heater. The drive element 50 being a piezoelectric element deforms by being supplied with a direct current voltage, applies pressure to ink in the channel, and causes ink droplets to be ejected from a nozzle being an opening of the channel. The drive element 50 being a heater generates heat by being supplied with a direct current voltage, causes ink in the channel to bump, and causes ink droplets to be ejected from the nozzle.

The number of ink droplets ejected from the nozzle can be specified from the number of times of supply of the direct current voltage or a direct current to the drive element 50. That is, the controller 51 calculates a count value of the number of ejected ink droplets by counting the number of times of the supply. The count value is used for calculation of the remaining amount of ink and the like. Details will be described later.

The printer 10 further includes the controller 51 and a communication I/F 47 which are shown in FIG. 1. The communication I/F 47 is connectable to the LAN 15. The controller 51 includes a CPU 52, memory 53, and a communication bus 54. The CPU 52, the memory 53, the touch panel 42, the operation switches 45, the communication I/F 47, and the cartridge I/F 49 are connected to the communication bus 54. That is, the CPU 52 is connected to the memory 53, the touch panel 42, the operation switches 45, the communication I/F 47 and the cartridge I/F 49 via the communication bus 54 so as to be able to exchange information and data with each other.

The memory 53 includes a ROM 55, a RAM 56, and an EEPROM 57. The ROM 55 stores an OS 58 being an operating system and a control program 59 in advance. Instructions described in the OS 58 and the control program 59 are executed by the CPU 52. That is, the OS 58 and the control program 59 are executed by the CPU 52. The OS 58 and the control program 59 executed by the CPU 52 causes the display panel 43 to display an image and receives an input from the user through the touch sensor 44 and/or the operation switches 45. The OS 58 and the control program 59 executed by the CPU 52 transmit and receive information and data through the communication I/F 47 and the cartridge I/F 49, and stores the received information and data in the memory 53.

The control program 59 may be a single program or a program including a plurality of modules. The control program 59 has, for example, a UI module, a communication module, and a print control module. Every module is executed quasi-concurrently by a so-called multitasking.

The UI module is a program that inputs image data to the display panel 43, causes the display panel 43 to display an image including objects such as icons, and receives a signal output from the touch sensor 44 and/or the operation switches 45. The communication module is a program for transmitting and receiving information and data in accordance with a communication protocol of the LAN 15 to which the communication I/F 47 is connected. The print control module is a program that generates and outputs, based on print data, drive signals to be input to drive circuits of the above-mentioned motors and drive circuits of the drive elements 50 which the head 34 have.

The RAM 56 is used for execution of the OS 58 and control program 59, and temporarily stores information and data in the execution of the OS 58 and control program 59. The EEPROM 57 stores the above-described node ID, CTG serial number, user identification information, destination address, printing condition information and transmission type information, and a first threshold value and a second threshold value. The node ID is a serial number or a MAC address of the printer 10. The controller 51 reads the CTG serial number, user identification information, destination address, printing condition information and transmission type information from the IC memory 18 and stores them in the EEPROM 57. The first threshold value is for determining whether the amount of ink stored in the cartridge 16 mounted in the mounting case 32 has decreased. That is, the first threshold value is for determining whether a level of ink is low. The second threshold value is for determining whether the ink stored in the cartridge 16 mounted in the mounting case 32 has been used up. That is, the second threshold value is for determining whether the cartridge 16 has become empty of ink (ink empty). Details will be described later.

Hereinafter, a process executed by the control program 59 of the printer 10 in a case where the communication setting is made to the printer 10 and the printer 10 to which the communication setting is made transmits the remaining amount values or the like to the information processing device 11 will be described. In the following description, processes executed by the control program 59 of the printer 10, the collection management program 64 of the information processing device 11, and the management program 74 of the management computer 13 will be described as processes executed by the controller 51 (particularly CPU 52) of the printer 10, the controller 61 of the information processing device 11, and the controller 71 of the management computer 13.

The printer 10 is installed by an operator. Then, the operator mounts the cartridge 16 provided by the system administrator on the mounting case 32 of the printer 10. A controller 51 of a printer 10 executes an operation mode determination process for setting an operation mode by determining whether the printer 10 is going to be used in the normal usage mode or in the contract usage mode. The operation mode determination process will be described in detail with reference to FIG. 6. For example, the controller 51 periodically executes the operation mode determination process. Alternatively, the controller 51 executes the operation mode determination process in response to the printer 10 being turned on. Alternatively, the controller 51 executes the operation mode determination process in response to determining that a particular input has been made through the touch sensor 44, the operation switch 45 and/or the communication I/F 47.

First, the controller 51 executes a process corresponding to a determination on whether the cartridge 16 is mounted in the mounting case 32 (S11). Specifically, the controller 51 determines whether communication with the IC chip 17 is possible through the cartridge I/F 49. The controller 51 determines that the cartridge 16 is mounted in the mounting case 32 based on the fact that the controller 51 can communicate with the IC chip 17 through the cartridge I/F 49 (S11: Yes). The controller 51 determines that the cartridge 16 is not mounted in the mounting case 32 based on the fact that the controller 51 cannot communicate with the IC chip 17 through the cartridge I/F 49 (S11: No). It is noted that the controller 51 may execute a process other than the above-described process as long as the process corresponds to the determination on whether the cartridge 16 is mounted in the mounting case 32.

The controller 51 executes the determination of step S11 for all the cartridges 16 that are mounted in the mounting case 32. When the controller 51 determines that at least one cartridge 16 is not mounted in the mounting case 32 (S11: No), the controller 51 causes the display panel 43 to display a cartridge mounting instruction screen (S12). Specifically, the controller 51 reads image data indicating the cartridge mounting instruction screen which is stored in advance in the ROM 55 of the memory 53, and outputs the image data to the display panel 43. The cartridge mounting instruction screen is, for example, a screen including characters indicating opening of the cover 22 and mounting of the cartridge 16 to the mounting case 32.

The controller 51 causes the display panel 43 to display the cartridge mounting instruction screen until the controller 51 determines that all the cartridges 16 are mounted in the mounting case 32. When the controller 51 determines that all the cartridges 16 are mounted in the mounting case 32 (S11: Yes), the controller 51 obtains the above-described type information from the IC memory 18 through the cartridge I/F 49 (S13). Then, the controller 51 determines whether pieces of the type information obtained from the IC memories 18 of all the cartridges 16 mounted in the mounting case 32 all indicate the normal usage mode, all indicate the contract usage mode, or are a mixture of the normal usage mode and the contract usage mode (S14). Specifically, the controller 51 determines whether the pieces of obtained type information are all "0" indicating the normal usage mode, all "1" indicating the contract usage mode, or a mixture of "0" indicating the normal usage mode and "1" indicating the contract usage mode. When the model number of the cartridge 16 indicates a usage mode, the controller 51 obtains the model number from the IC memory 18. Then, the controller 51 determines whether the obtained model number matches the model number stored in advance in the memory 53 as a model number indicating the normal usage mode, and whether the obtained model number matches a model number stored in advance in the memory 53 as the model number indicating the contract usage mode.

When the controller 51 determines that the pieces of obtained type information all indicate the normal usage mode (S14: all normal usage mode), the controller 51 determines whether the operation mode information stored in the memory 53 indicates the first mode, the second mode, or no operation mode (S15). The operation mode information is information that the controller 51 stores in the EEPROM 57 of the memory 53 in response to determining the operation mode. The operation mode information is about, for example, a first mode flag and a second mode flag stored in the EEPROM 57. The first mode flag having a value of "ON" indicates the first mode. The second mode flag having a value of "ON" indicates the second mode. The first mode flag and the second mode flag both having a value "OFF" indicate that the operation mode is not determined. Initial values of the first mode flag and the second mode flag are both "OFF." The first mode indicates the normal usage mode. The second mode indicates the contract usage mode.

In response to the first mode flag having the value of "OFF" and the second mode flag having the value of "OFF" being stored in the EEPROM 57, the controller 51 determines that the operation mode information does not indicate the operation mode (S15: none). When the controller 51 determines that the operation mode information does not indicate the operation mode (S15: none), the controller 51 sets the operation mode to the first mode (S16) and ends the operation mode determination process. Specifically, the controller 51 stores the first mode flag having the value of "ON" in the EEPROM 57. That is, when the cartridges 16 all of which are in the normal usage mode are mounted in the mounting case 32 of the printer 10 in which the operation mode is not determined, the operation mode is set to the first mode. In response to the first mode flag having the value of "ON" and the second mode flag having the value of "OFF" being stored in the EEPROM 57, the controller 51 determines that the operation mode information indicates the first mode (S15: first mode). When the controller 51 determines that the operation mode information indicates the first mode (S15: first mode), the controller 51 ends the operation mode determination process. That is, when the cartridges 16, all of which are in the normal usage mode, are mounted in the mounting case 32 of the printer 10 in which the operation mode is set to the first mode, the operation mode is maintained in the first mode. In response to the first mode flag having the value of "OFF" and the second mode flag having the value of "ON" being stored in the EEPROM 57, the controller 51 determines that the operation mode information indicates the second mode (S15: second mode). When the controller 51 determines that the operation mode information indicates the second mode (S15: second mode), the controller 51 performs an error notification (S17). Specifically, the controller 51 reads image data indicating an error display screen stored in advance in the ROM 55 of the memory 53, and inputs the read image data to the display panel 43. That is, when the cartridges 16, all of which are in the normal usage mode, are mounted in the mounting case 32 of the printer 10 in which the operation mode is set to the second mode, the error display screen is displayed on the display panel 43. The error display screen includes, for example, characters "An appropriate cartridge is not mounted. Please mount an appropriate cartridge," an "OK" icon, and a "CANCEL" icon. Although not shown in the flowchart, in response to selection of the "OK" icon on the error display screen, the controller 51 executes the processes on and after step S11 again. For example, the user remounts the cartridge 16 of the contract usage mode, which is the appropriate cartridge 16, in the mounting case 32, and then selects the "OK" icon on the error display screen. When the controller 51 determines that the "CANCEL" icon is selected on the error display screen, the controller 51 changes the operation mode to the first mode (S18), and ends the operation mode determination process. Specifically, the controller 51 stores the first mode flag having the value of "ON" in the EEPROM 57, and stores the second mode flag having the value of "OFF" in the EEPROM 57.

Figure 11A:
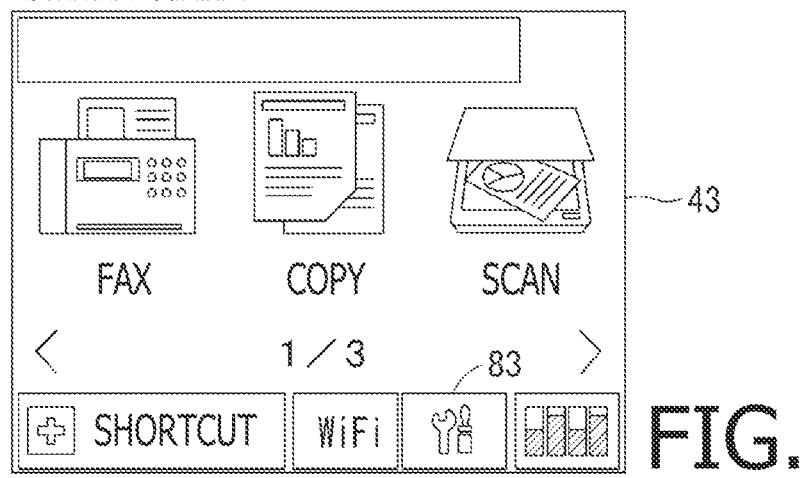
FIG. 11A is a diagram illustrating a standby screen.
Figure 11B:
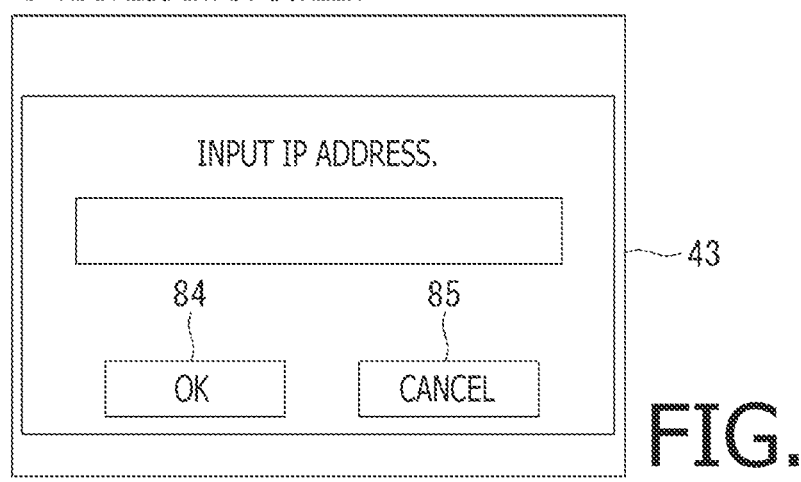
FIG. 11B is a diagram illustrating an IP address input screen.
Figure 11C:
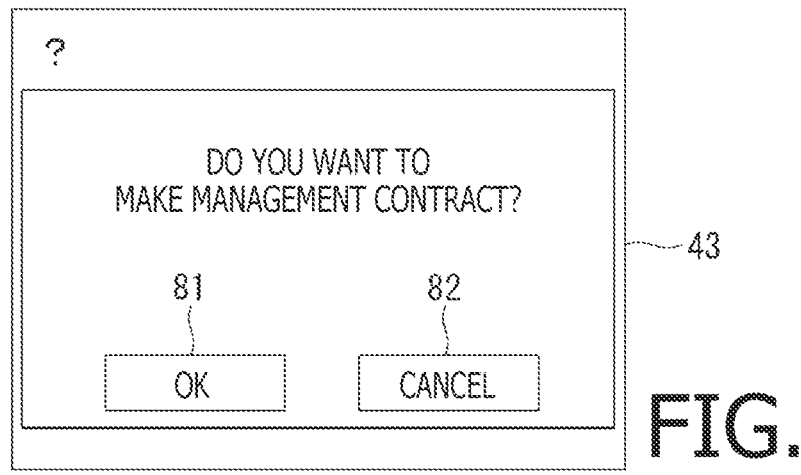
FIG. 11C is a diagram illustrating a contract confirmation screen.

When the controller 51 determines that, in step S14, all the pieces of obtained type information indicate the contract usage mode (S14: all contract usage mode), the controller 51 executes the process of step S19 which is similar to the process of step S15. When the controller 51 determines that the operation mode information stored in the EEPROM 57 indicates no operation mode (S19: none), the controller 51 causes the display panel 43 to display a contract confirmation screen (S25). Specifically, the controller 51 reads image data indicating the contract confirmation screen stored in the ROM 55 of the memory 53, and inputs the read image data to the display panel 43. That is, when the cartridges 16 all being for the contract use mode are mounted in the mounting case 32 of the printer 10 in which the operation mode is not set, the contract confirmation screen is displayed on the display panel 43. FIG. 11C illustrates the contract confirmation screen. The contract confirmation screen includes characters "DO YOU WANT TO MAKE MANAGEMENT CONTRACT?," an "OK" icon 81, and a "CANCEL" icon 82.

Figure 7:
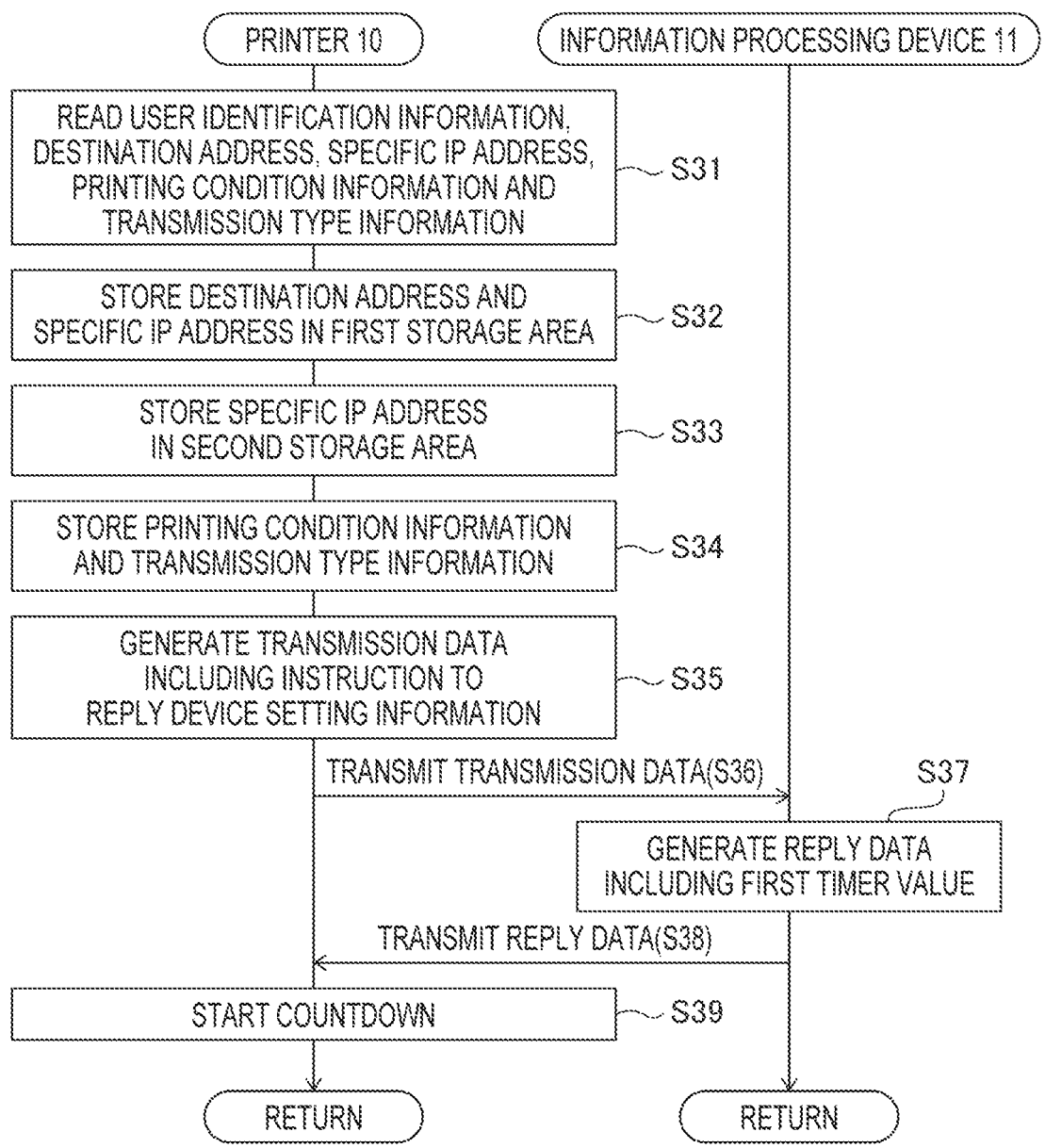
FIG. 7 is a diagram illustrating a communication setting process.

The controller 51 causes the display panel 43 to display the contract confirmation screen until the "OK" icon 81 or the "CANCEL" icon 82 is selected. Then, the controller 51 determines whether the "OK" icon 81 or the "CANCEL" icon 82 has been selected on the contract confirmation screen (S26). Specifically, the controller 51 determines whether the position information indicating the "OK" icon 81 or the "CANCEL" icon 82 has been input from the touch sensor 44 (S26). Hereinafter, the input of the position information indicating the icon to the controller 51 will be described simply as "the icon has been selected." When the controller 51 determines that the "CANCEL" icon 82 has been selected (S26: CANCEL), the controller 51 sets the operation mode to the first mode (S16). Specifically, the controller 51 stores the first mode flag having the value of "ON" in the EEPROM 57. When the controller 51 determines that the "OK" icon 81 has been selected (S26: OK), the controller 51 sets the operation mode to the second mode (S27). Specifically, the controller 51 stores the second mode flag having the value of "ON" in the EEPROM 57. Then, the controller 51 executes a communication setting process (S28). The communication setting process will be described in detail with reference to FIG. 7.

First, the controller 51 of the printer 10 reads the user identification information, the destination address, the specific IP address, the printing condition information and the transmission type information from the IC memory 18 of each cartridge 16 mounted in the mounting case 32 through its corresponding cartridge I/F 49 (S31). Then, the controller 51 stores the read user identification information in the EEPROM 57. The controller 51 stores the read destination address and specific IP address in a first storage area being a particular storage area of the EEPROM 57 and being defined as a storage area for storing a communication setting (S32). The controller 51 stores the read specific IP address as the original specific IP address in a second storage area which is a particular storage area in the EEPROM 57 (S33). The controller 51 further stores the printing condition information and the transmission type information read from the IC memory 18 in the EEPROM 57 (S34). Then, the controller 51 generates transmission data (S35). The transmission data includes the user identification information and the node ID stored in the EEPROM 57 and initial notification information indicating that the communication setting has been performed. The controller 51 transmits a request including the generated transmission data to the information processing device 11 indicated by the destination address stored in the EEPROM 57 through the communication I/F 47 (S36). The request transmitted by the controller 51 conforms to the TCP/IP communication protocol. The controller 51 uses the specific IP address stored in the first storage area of the EEPROM 57 as a transmission source of the request.

Although not illustrated in the flowchart, the request transmitted by the printer 10 is received by the router 12 through the LAN 15. The router 12 that has received the request obtains the specific IP address indicating the transmission source of the request. Then, the router 12 specifies a record having an IP address matching the obtained specific IP address in the communication management database (FIG. 5A). Then, the router 12 obtains the above-described restriction information and permission information (FIG. 5B) included in the specified record. The router 12 determines whether to permit or reject transmission of the received request to the Internet 14 based on the obtained restriction information and permission information. For example, the router 12 determines whether the time at which the request is received is within the range of the time of day, which is the restriction information or permission information, indicated by the item "PERMITTED TIME OF DAY", whether communication with the information processing device 11 is permitted, and the like. In response to determining that the transmission is not permitted, the router 12 transmits information indicating that the transmission is not permitted back to the printer 10 indicated by the specific IP address. In response to determining that the transmission is permitted, the router 12 transmits the request conforming to a communication protocol such as HTTP or HTTPS through the Internet 14 to a destination address.

The controller 61 of the information processing device 11 receives the request transmitted by the printer 10 through the router 12 (S36). The controller 61 identifies, in the printer management database, a record having user identification information and a node ID that match the user identification information and the node ID included in the received request. In the following description, the user identification information and the node ID are described as identification information. If the controller 61 can specify the record only by the node ID, the identification information may be only the node ID. That is, the request transmitted by the printer 10 may not include the user identification information.

In response to the initial notification information being included in the received request, the controller 61 starts management of the printer 10 indicated by the specified record. For example, the controller 61 registers "ON" in a non-illustrated item "START MANAGEMENT" included in the printer management database. That is, the printer 10 indicated by the record in which "ON" is registered in the item "START MANAGEMENT" is a printer in which the management is started after the communication setting and the contract with the user are performed. Then, the controller 61 obtains the transmission timing registered in the sub-item "NORMAL" of the non-illustrated item "TRANSMISSION TIMING" of the specified record. As described above, the transmission timing is "12 hours," "24 hours" or the like. Then, the controller 61 generates reply data including the obtained transmission timing (S37), and transmits a response including the generated reply data through the communication OF and the Internet 14 back to the printer 10 (S38).

Figure 6:
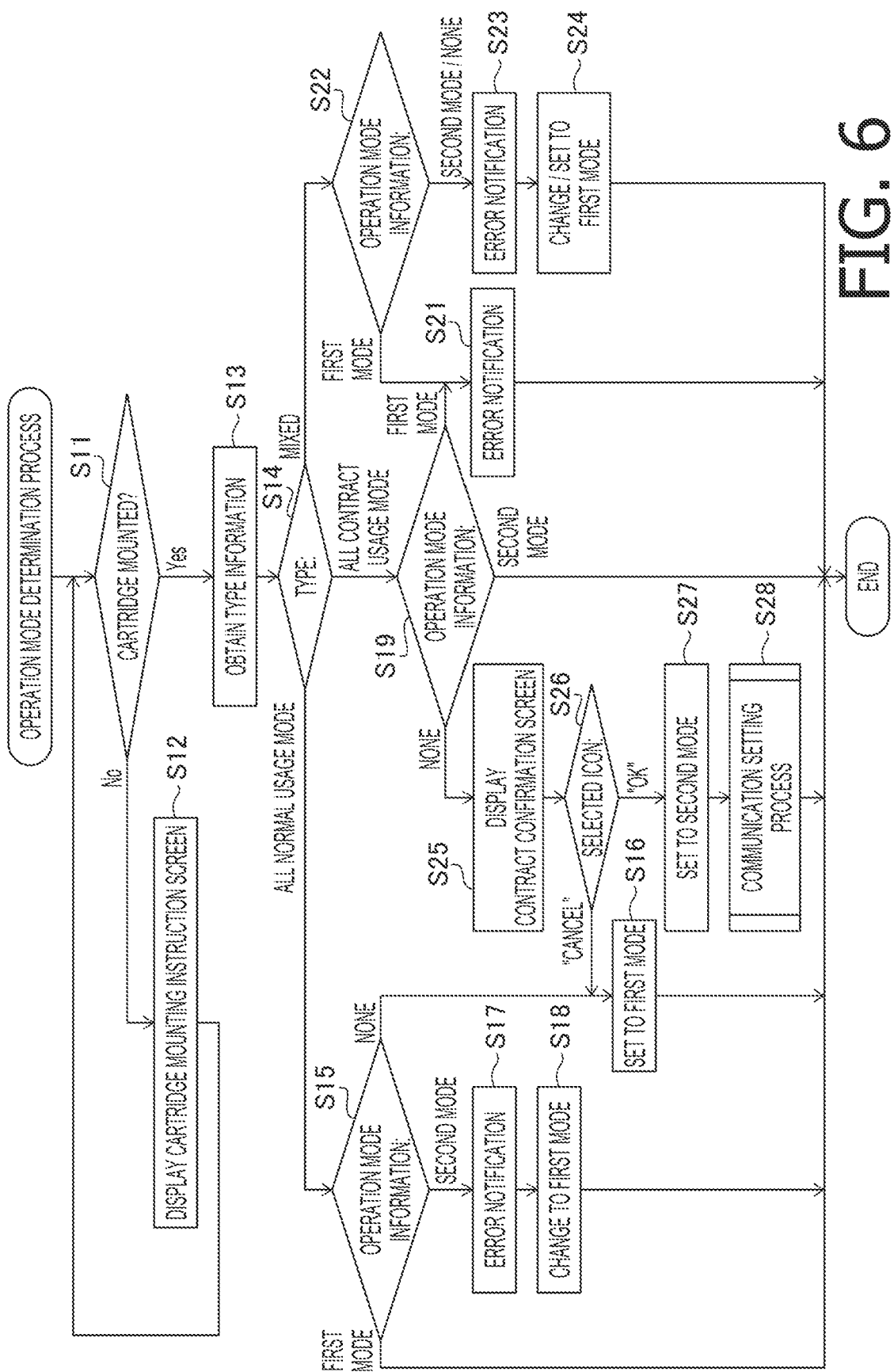
FIG. 6 is a flowchart of an operation mode determination process.

The controller 51 of the printer 10 receives the response transmitted by the information processing device 11 through the router 12 and the LAN 15 (S38). Then, the controller 51 obtains a first timer value included in the received response. The controller 51 sets the obtained first timer value as an initial value, causes a timer counter to start a countdown (S39), and ends the communication setting process. Then, as shown in FIG. 6, the controller 51 ends the operation mode determination process. Although not illustrated in the flowchart, if the controller 51 does not receive the response transmitted by the information processing device 11 within a particular time period after the transmission of the request, the controller 51 executes a retry for retransmitting the request.

When the controller 51 determines that, in step S19, the operation mode information stored in the EEPROM 57 indicates the second mode (S19: second mode), the controller 51 ends the operation mode determination process. That is, when the cartridges 16, all of which are in the contract usage mode, are mounted in the mounting case 32 of the printer 10 in which the operation mode is set to the second mode, the operation mode is maintained in the second mode. When the controller 51 determines that the operation mode information stored in the EEPROM 57 indicates the first mode (S19: first mode), the controller 51 performs an error notification which is a process similar to the process in step S17 (S21). That is, when the cartridges 16, all of which are in the contract usage mode, are mounted in the mounting case 32 of the printer 10 in which the operation mode is set to the first mode, the operation mode is maintained in the first mode. Although not shown in the flowchart, the controller 51 executes the processes on after step S11 again in response to selection of the "OK" icon on the error display screen. For example, the user remounts the cartridges 16 all being for the normal usage mode, which are the appropriate cartridges 16, in the mounting case 32, and then selects the "OK" icon on the error display screen. When the controller 51 determines that the "CANCEL" icon is selected on the error display screen, the controller 51 ends the operation mode determination process.

When the controller 51 determines that, in step S14, the pieces of obtained type information are a mixture of the normal usage mode and the contract usage mode (S14: mixed), the controller 51 executes the process of step S22 which is similar to the process of step S15. When the controller 51 determines that the operation mode information stored in the EEPROM 57 indicates the first mode (S22: first mode), the controller 51 performs the process of step S21 described above. That is, when the cartridge 16 in the normal usage mode and the cartridge 16 in the contract usage mode are mounted in the mounting case 32 of the printer 10 in which the operation mode is set to the first mode, the error display screen is displayed and then the first mode is maintained. When the controller 51 determines that the operation mode information stored in the EEPROM 57 indicates the second mode, or when the controller 51 determines that the operation mode information does not indicate the operation mode (S22: second mode/none), the controller 51 executes the processes of steps S23 and S24 which are similar to the processes of steps S17 and S18 described above. That is, when the cartridge 16 in the normal usage mode and the cartridge 16 in the contract usage mode are mounted in the mounting case 32 of the printer 10 in which the operation mode is set to the second mode, the error display screen is displayed then the operation mode is changed to the first mode. Specifically, the first mode flag having the value of "ON" is stored in the EEPROM 57, and the second mode flag having the value of "OFF" is stored in the EEPROM 57. When the cartridge 16 in the normal usage mode and the cartridge 16 in the contract usage mode are mounted in the mounting case 32 of the printer 10 in which the operation mode is not set, the error display screen is displayed, and then the operation mode is set to the first mode. Specifically, the first mode flag having the value of "ON" is stored in the EEPROM 57.

Next, a counting process, a remaining amount value calculation process and a failure determination process executed by the controller 51 of the printer 10 to transmit information such as the remaining amount value to the information processing device 11 will be described with reference to FIGS. 8A to 8C. The counting process is a process of calculating a total count value indicating an amount of ink flowed out from the head 34 and storing the total count value in the memory 53. The remaining amount value calculation process is a process of calculating the remaining amount value indicating an amount of ink stored in the cartridge 16 mounted in the mounting case 32 based on the total count value. The failure determination processing is a process to be executed when a failure occurs.

First, the counting process illustrated in FIG. 8A will be described. The counting process is executed in response to the ink flowing out from the head 34. For example, the controller 51 executes the counting process in response to inputting print data to the print engine 40 and instructing the print engine 40 to execute printing. Alternatively, the controller 51 executes the counting process in response to driving of a pump included in a maintenance mechanism. Alternatively, the controller 51 executes the counting process in response to driving of the drive element 50 for maintenance of the head 34.

First, the controller 51 counts the number of times the drive element 50 has been driven to obtain the count value (S41). The count value indicates the number of times ink droplets have been ejected from the nozzles of the head 34, that is, the amount of ink that has flowed out from the head 34. When the above-described pump is driven, the controller 51 determines the count value by converting the amount of ink that has been sucked from the head 34 by the pump into the number of times of ejection of ink droplets (S41).

Then, the controller 51 determines whether the signal input from the liquid level sensor 38 has changed from the first detection signal to the second detection signal before the ink flows out of the head 34 and after the ink flowed out of the head 34 (S42). That is, in step S42, the controller 51 determines whether the liquid level of the ink stored in the cartridge 16 mounted in the mounting case 32 has become lower than the detection position due to the outflow of the ink from the head 34. When the controller 51 determines that the signal input from the liquid level sensor 38 has changed from the first detection signal to the second detection signal (S42: second detection signal), the controller 51 stores the sensor flag having the value of "ON" in the EEPROM 57 of the memory 53 (S43). The initial value of the sensor flag is "OFF." The controller 51 also resets the total count value (S44). The total count value is a value indicating the total amount of ink that has flowed out from the head 34. That is, when the liquid surface of the ink stored in the cartridge 16 mounted in the mounting case 32 reaches the detection position, the total count value is reset. On the other hand, when the controller 51 determines that the signal input from the liquid level sensor 38 has not changed from the first detection signal to the second detection signal (S42: first detection signal), the controller 51 skips the processes of steps S43 and S44.

The controller 51 adds the count value determined in step S41 to the total count value stored in EEPROM 57 and stores the result in EEPROM 57 as a new total count value (S45). When the sensor flag is "OFF," the total count value indicates a consumption amount of the ink stored in the cartridge 16 mounted in the mounting case 32, which is an amount of the ink consumed from the initial storing amount. When the sensor flag is "ON," the total count value indicates the consumption amount from a state in which the liquid surface of the ink stored in the cartridge 16 mounted in the mounting case 32 is at the detection position. A fixed storing amount value indicating the amount of ink stored in the cartridge 16 in the state in which the liquid surface of the ink stored in the cartridge 16 mounted in the mounting case 32 is at the detection position is stored in advance in the ROM 55 or EEPROM 57. In the remaining amount value calculation process described later, the total count value when the sensor flag is "OFF" will be described as a first total count value, and the total count value when the sensor flag is "ON" will be described as a second total count value. The first total count value and the second total count value may be separately stored in the EEPROM 57 without resetting the total count value in step S44.

Then, the controller 51 executes a process corresponding to a determination as to whether the cartridge 16 has been replaced (S46). An example of the determination will be described. When the cartridge 16 is mounted in the mounting case 32, the controller 51 obtains the CTG serial number from the IC memory 18 through the cartridge I/F 49. Then, the controller 51 determines whether the CTG serial number stored in the EEPROM 57 of the memory 53 matches the CTG serial number obtained from the IC memory 18. In response to determining that the CTG serial number stored in the EEPROM 57 of the memory 53 does not match the CTG serial number obtained from the IC memory 18, the controller 51 determines that the cartridge 16 has been replaced. In response to determining that the cartridge 16 has been replaced, the controller 51 overwrites the CTG serial number stored in the EEPROM 57 of the memory 53 with the CTG serial number obtained from the IC memory 18.

When the controller 51 determines that the cartridge 16 has been replaced (S46: Yes), the controller 51 resets the total count value stored in EEPROM 57 (S47) and ends the counting process. On the other hand, when the controller 51 determines that the cartridge 16 has not been replaced (S46: No), the controller 51 stores the sensor flag having the value of "OFF" in the EEPROM 57 (S48) and ends the counting process.

Next, the remaining amount value calculation process will be described with reference to FIG. 8B. For example, in response to determining to display the remaining amount of ink on the display panel 43, or in response to determining to transmit the remaining amount of ink to the information processing device 11, the controller 51 executes the remaining amount value calculation process. First, the controller 51 determines whether the value of the sensor flag stored in the EEPROM 57 is "ON" or "OFF" (S51). That is, in step S51, the controller 51 determines whether the total count value stored in the EEPROM 57 is the first total count value or the second total count value. When the controller 51 determines that the value of the sensor flag stored in the EEPROM 57 is "OFF" (S51: OFF), the controller 51 reads the initial storing amount value from the EEPROM 57 or from the IC memory 18 through the cartridge I/F 49 (S52). The controller 51 further reads the first total count value from the EEPROM 57 (S53). Then, the controller 51 calculates the remaining amount value by subtracting the read first total count value from the read initial storing amount value (S54).

On the other hand, when the controller 51 determines that the value of the sensor flag stored in the EEPROM 57 is "ON" (S51: ON), the controller 51 reads the fixed storing amount value from the ROM 55 or the EEPROM 57 (S55). The controller 51 further reads the second total count value from the EEPROM 57 (S56). Then, the controller 51 calculates the remaining amount value by subtracting the read second total count value from the read fixed storing amount value (S57). The controller 51 stores the remaining amount value calculated in step S54 or step S57 in the RAM 56 or the EEPROM 57 (S58), and ends the remaining amount value calculation process.

Figure 8A:
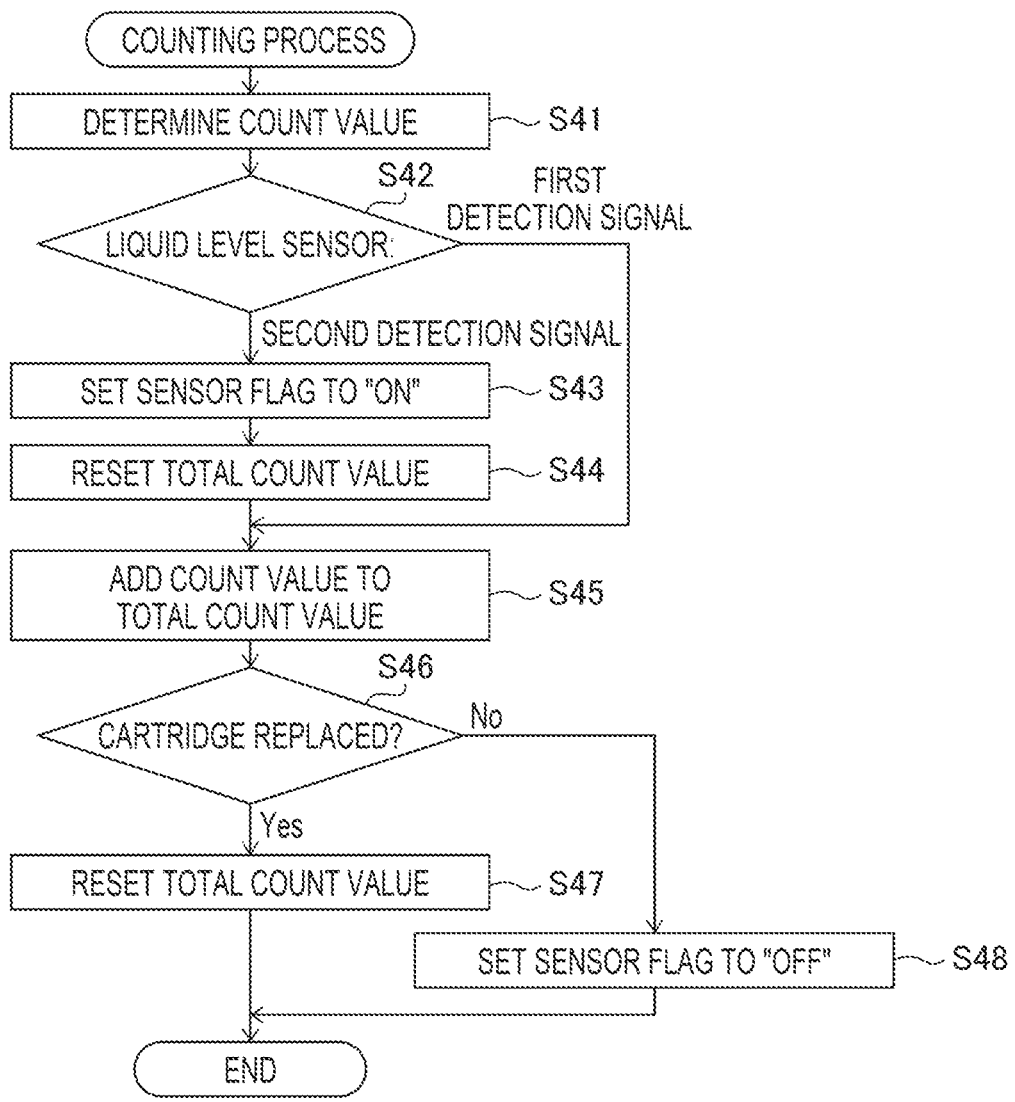
FIG. 8A is a flowchart of a counting process.
Figure 8B:
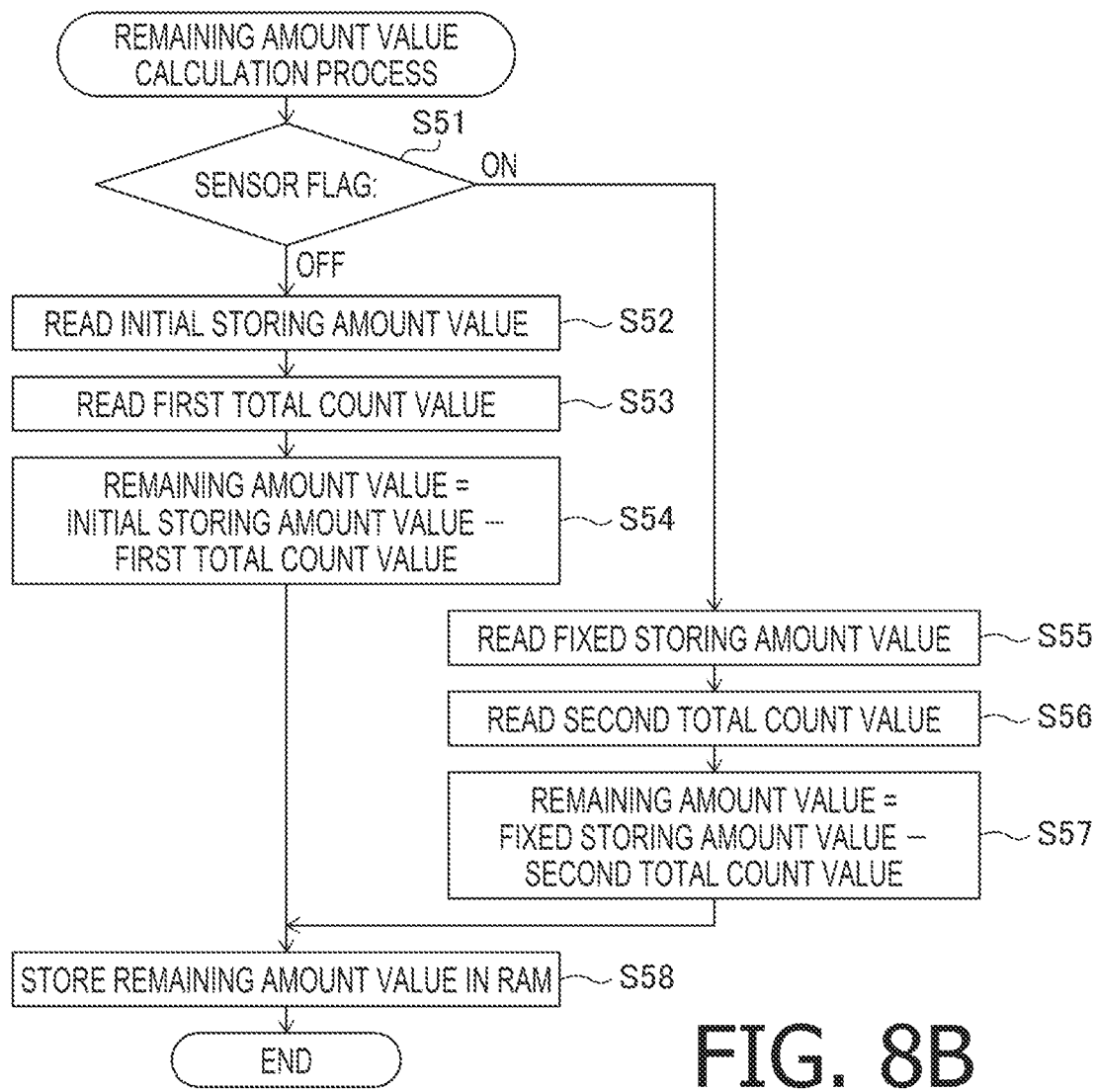
FIG. 8B is a flowchart of a remaining amount value calculation process.
Figure 8C:
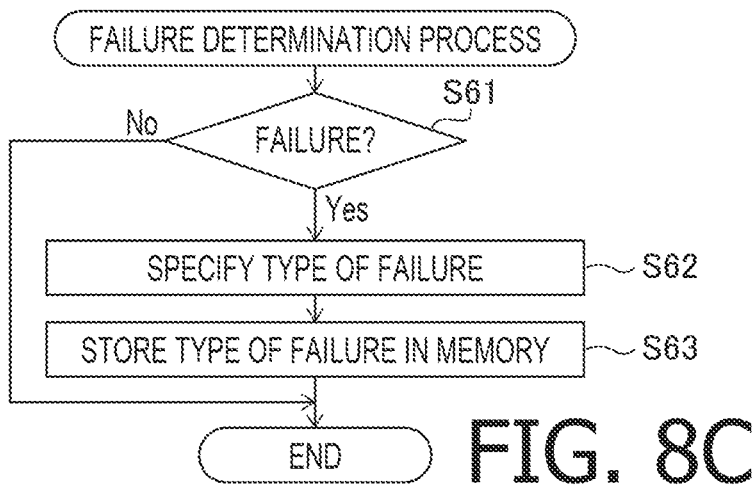
FIG. 8C is a flowchart of a failure determination process.

The counting process illustrated in FIG. 8A and the remaining amount calculation process illustrated in FIG. 8B are executed for all the cartridges 16 mounted in the mounting case 32. That is, the counting process and the remaining amount calculation process are executed for each of the inks of magenta, cyan, yellow, and black. Then, in step S58, the remaining amount value of each color is stored in the memory 53.

Next, the failure determination process will be described with reference to FIG. 8C. For example, the controller 51 periodically executes the failure determination process. First, the controller 51 determines whether a failure has occurred (S61). The failure includes not only a failure in the print engine 40 but also a failure in a scanner or the like when the printer 10 includes the scanner or the like. The failure is a sheet jam or the like. Since the process of determining whether a failure has occurred by the controller 51 is well known, a detailed description thereof is herein omitted. When the controller 51 determines that no failure has occurred (S61: No), the controller 51 ends the failure determination process. On the other hand, when the controller 51 determines that a failure has occurred (S61: Yes), the controller 51 specifies a type of failure (S62). Then, the controller 51 stores information indicating the failure in the EEPROM 57 of the memory 53 (S63). For example, in response to determining that a sheet jam has occurred (61: Yes, S62), the controller 51 stores a sheet jam flag having a value of "ON" in the EEPROM 57 (S63). The initial value of the sheet jam flag is "OFF". In response to determining that the sheet jam has been cleared, the controller 51 stores the sheet jam flag having the value of "OFF" in the EEPROM 57. After executing the process of step S63, the controller 51 ends the failure determination process.

Next, the data transmission process for transmitting information such as the remaining amount value to the information processing device 11 will be described with reference to FIGS. 9A and 9B. For example, the controller 51 executes the data transmission process in response to causing ink to flow out from the head 34 by executing printing or maintenance. The controller 51 executes the data transmission process in response to determining that the timer counter that started the countdown in step S39 has timed out. The controller 51 executes the data transmission process in response to determining that a failure has occurred. The controller 51 executes the data transmission process in response to determining that the cartridge 16 mounted in the mounting case 32 has been replaced. In the example illustrated in FIGS. 9A and 9B, the process of generating the transmission data in response to the replacement of the cartridge 16 is omitted.

First, to execute the data transmission process, the controller 51 determines whether a failure has occurred (S71). Specifically, the controller 51 determines whether a failure flag indicating a failure such as sheet jam flag is "ON." When the failure flag is "ON," the controller 51 determines to execute the data transmission process in response to the occurrence of the failure (S71: Yes). When the failure flag is "OFF," the controller 51 determines to execute the data transmission process under a condition other than the failure (S71: No). When the controller 51 determines to execute the data transmission process due to the occurrence of failure (S71: Yes), the controller 51 obtains the type of failure. Specifically, the controller 51 determines which failure flag is "ON." For example, when the failure flag indicating sheet jam flag is "ON," the controller 51 obtains a failure type "sheet jam." Then, the controller 51 determines whether "ON" or "OFF" is associated with the obtained type of failure in the transmission type information stored in the EEPROM 57 (S72). That is, in step S72, the controller 51 determines whether to transmit the failure information to the information processing device 11. For example, when a sheet jam occurs in the printer 10 and "ON" is associated with "sheet jam" in the transmission type information, the controller 51 determines to transmit the failure information "sheet jam" to the information processing device 11 (S72: ON).

When the controller 51 determines that the obtained type of failure is associated with "ON" in the transmission type information (S72: ON), the controller 51 generates first transmission data (S73). The first transmission data includes information indicating the type of failure and the node ID stored in the EEPROM 57. On the other hand, when the controller 51 determines that the obtained type of failure is associated with "OFF" in the transmission type information (S72: OFF), the controller 51 skips the process of step S73. That is, the controller 51 does not notify the information processing device 11 of the failure.

When the controller 51 determines, in step S71, to execute the data transmission process under a condition other than a failure (S71: No), the controller 51 obtains the count value stored in EEPROM 57 (S74). The count value is a value stored in the EEPROM 57 in the counting process (FIG. 8A). The controller 51 determines whether the obtained count value is the second total count value and the second total count value is greater than or equal to the above-described second threshold value stored in the EEPROM 57 (S75). That is, in step S75, the controller 51 determines whether the cartridge 16 has become empty of ink (ink empty). When the controller 51 determines that the second total count value is greater than or equal to the second threshold value (S75: Yes), the controller 51 determines whether "INK EMPTY" is associated with "ON" or "OFF" in the transmission type information stored in EEPROM 57 (S76). That is, in step S76, the controller 51 determines whether to transmit the information indicating that the cartridge 16 is empty of ink (ink empty) to the information processing device 11. When the controller 51 determines that "INK EMPTY" is associated with "ON" in the transmission type information (S76: ON), the controller 51 generates second transmission data (S77). The second transmission data includes information indicating that the cartridge 16 is empty of ink (ink empty), and the user identification information and the node ID stored in the EEPROM 57. When the controller 51 determines that "INK EMPTY" is associated with "OFF" in the transmission type information (S76: OFF), the controller 51 skips the process of step S77. That is, the information indicating ink empty is not transmitted to the information processing device 11.

When the controller 51 determines that, in step S75, the second total count value is not greater than or equal to the second threshold value (S75: No), the controller 51 determines whether the second total count value is greater than or equal to the first threshold value (S78). That is, in step S78, the controller 51 determines whether the level of ink is low (ink low). When the controller 51 determines that the second total count value is greater than or equal to the first threshold value (S78: Yes), the controller 51 determines whether "INK LOW" is associated with "ON" or "OFF" in the transmission type information stored in EEPROM 57 (S79). That is, in step S79, the controller 51 determines whether to transmit the information indicating that the level of ink is low (ink low) to the information processing device 11. When the controller 51 determines that "INK LOW" is associated with "ON" in the transmission type information (S79: ON), the controller 51 generates third transmission data (S80). The third transmission data includes information indicating that the level of ink has become low (ink low) and the node ID stored in the EEPROM 57. When the controller 51 determines that "INK LOW" is associated with "OFF" in the transmission type information (S79: OFF), the controller 51 skips the process of step S80. That is, the information indicating ink low is not transmitted to the information processing device 11.

When the controller 51 determines that, in step S78, the second total count value is not greater than or equal to the first threshold value (S78: No), the controller 51 determines whether to execute the data transmission process in response to the timer counter having finished its countdown (S81). When the controller 51 determines that the timer counter has finished its countdown or a transmission timing has come (S81: Yes), the controller 51 executes the remaining amount value calculation process (FIG. 8B) (S82). When the controller 51 determines that the remaining amount value calculated in the remaining amount value calculation process is stored in the RAM 56, the controller 51 reads and obtains the remaining amount value from the RAM 56 in step S82. Then, the controller 51 generates fourth transmission data (S83). The fourth transmission data includes information including the remaining amount value and the like, and the user identification information and the node ID stored in the EEPROM 57. When the controller 51 determines that the transmission timing has not come yet (S81: No), the controller 51 determines to execute the data transmission process under a condition other than the timer counter having finished its countdown. The controller 51 skips the processes of steps S82 and S83.

Figure 10A:
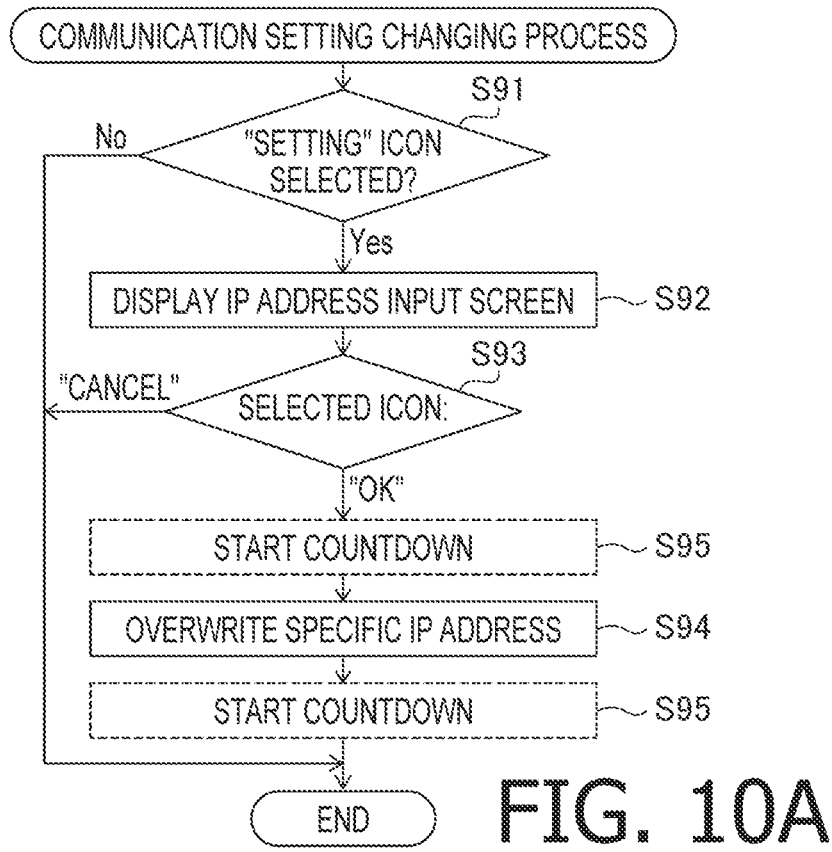
FIG. 10A is a flowchart of a communication setting changing process.

After executing the processes of steps S72, S73, S76, S77, S79, S80, S81 and S83, the controller 51 determines whether the transmission data has been generated (S84). When the controller 51 determines that the transmission data has not been generated (S84: No), the controller 51 ends the data transmission process. When the controller 51 determines that the transmission information has been generated (S84: Yes), the controller 51 determines whether the communication setting such as the specific IP address has been changed (S85). Specifically, the controller 51 determines whether the IP address stored in the first storage area in the EEPROM 57 specified as the storage area for storing the communication setting matches the original specific IP address stored in the second storage area in the EEPROM 57. When the IP address stored in the first storage area matches the original specific IP address stored in the second storage area, the controller 51 determines that the communication setting information has not been changed (S85: No). When the IP address stored in the first storage area does not match the original specific IP address stored in the second storage area, the controller 51 determines that the communication setting information has been changed (S85: Yes). The communication setting may be changed by the user. For example, when the user wants to cause the printer 10 to download an image from a web page on the Internet 14 and cause the printer 10 to print the image, the printer 10 may not be able to print the image due to the restriction imposed on the printer 10. Specifically, in the communication management database, "100" is registered in the item "PERMITTED COMMUNICATION VOLUME" for the IP address set in the printer 10. Therefore, when the data volume of the image exceeds "100," the printer 10 cannot download the image. Furthermore, as for the IP address set in the printer 10, in the communication management database, "NOT PERMITTED" is registered in the item "FREE CONNECTION." Therefore, the printer 10 may not be permitted to access the image. In this case, the user changes the IP address set in the printer 10 so that the printer 10 can access the image. For example, the user sets an IP address such as "192.168.1.20" to which no node is assigned in the printer 10. A communication setting changing process for receiving a change of the IP address will be described with reference to FIGS. 10A, 11A, and 11B.

The controller 51 of the printer 10 determines whether the "SETTING" icon 83 has been selected on the standby screen (FIG. 11A) displayed on the display panel 43 (S91). When the controller 51 determines that the "SETTING" icon has not been selected (S91: No), the controller 51 ends the communication setting changing process. When the controller 51 determines that the "SETTING" icon has been selected (S91: Yes), the controller 51 causes the display panel 43 to display an IP address input screen (FIG. 11B), for example, after receiving selection of a particular icon (S92). The IP address input screen includes characters "INPUT IP ADDRESS," a text box, an "OK" icon 84 and a "CANCEL" icon 85. The user inputs an IP address in the text box using the touch sensor 44 and/or the operation switches 45, and then selects the "OK" icon 84. The controller 51 determines whether the "OK" icon 84 or the "CANCEL" icon 85 has been selected on the IP address input screen (S93). When the controller 51 determines that the "CANCEL" icon 85 has been selected (S93: CANCEL), the controller 51 ends the communication setting changing process. When the controller 51 determines that the "OK" icon 84 has been selected (S93: OK), the controller 51 overwrites the specific IP address stored in the first storage area of the EEPROM 57 with the IP address input in the text box (S94) and ends the communication setting changing process. Step S95 indicated by the broken line in the figure will be described later in a description of a variation.

Figure 9A:
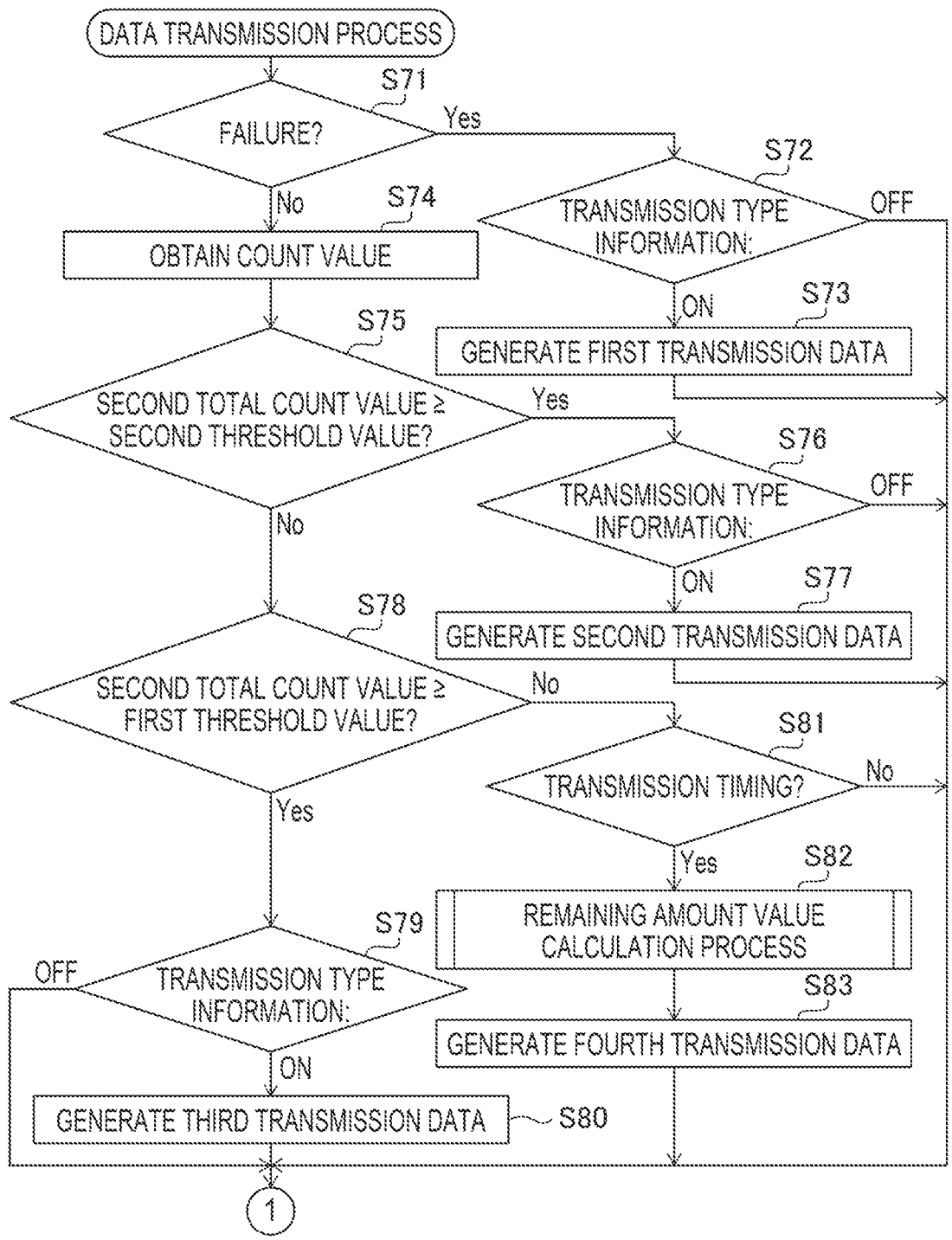
FIG. 9A is a flowchart of a data transmission process.
Figure 9B:
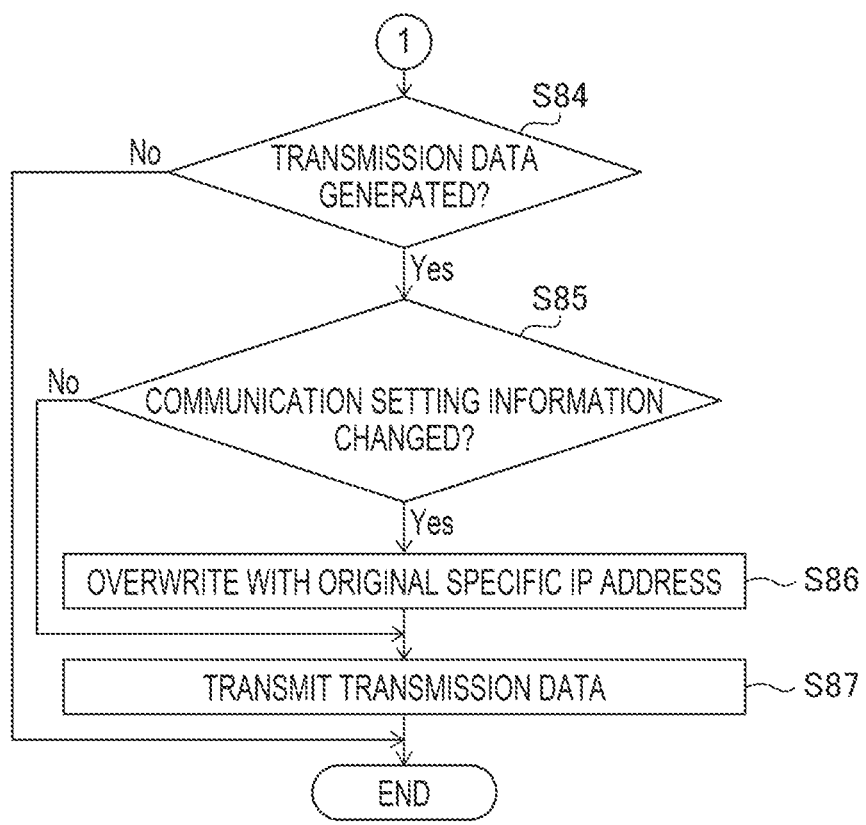
FIG. 9B is a continuation of FIG. 9A.

When the controller 51 of the printer 10 determines that, in step S85 of the data transmission process illustrated in FIGS. 9A and 9B, the specific IP address stored in the first storage area of the EEPROM 57 has been changed (S85: Yes), the controller 51 changes the IP address to the original one (S86). Specifically, the controller 51 overwrites the IP address stored in the first storage area with the original specific IP address stored in the second storage area of the EEPROM 57. That is, the IP address changed by the user is changed to the IP address assigned to the printer 10 in the communication management database. For example, if the user forgets to reinstate the IP address after changing the IP address, the printer 10 may become unable to transmit information to the information processing device 11 depending on the restriction imposed to the changed IP address. For example, assuming that an IP address "192.168.1.38" is set in the printer 10, as shown in FIGS. 5A and 5B, the IP address is associated with the item group "B." The group "B" is associated with "NOT PERMITTED" of the item "INFORMATION PROCESSING DEVICE." That is, the printer 10 in which the IP address "192.168.1.38" is set cannot transmit information to the information processing device 11. Alternatively, if the transmission timing at which the printer 10 transmits information to the information processing device 11 is not within in the permitted time of day indicated by the restriction information associated with the IP address set in the printer 10, the printer 10 cannot transmit information to the information processing device 11. If the IP address remains changed, the printer 10 may be maintained to a state in which it can communicate with external devices without restriction. In this case, security within the communication system is lowered. Therefore, the controller 51 of the printer 10 changes the changed IP address to the original specific IP address which is the original appropriate IP address in response to generating the transmission data (S86). In other words, the controller 51 overwrites the changed IP address with the original specific IP address in response to generating the transmission data (S86). Therefore, the printer 10 can transmit information to the information processing device 11, and security within the communication system is ensured.

When the controller 51 of the printer 10 determines that the specific IP address stored in the first storage area of the EEPROM 57 has not been changed (S85: No), the controller 51 skips the process of step S86. Then, the controller 51 generates a request including the transmission data and transmits the generated request to the information processing device 11 in the same manner as in step S36 (S87).

Although not illustrated in the flowchart, the request transmitted by the printer 10 is received by the information processing device 11. The controller 61 of the information processing device 11 specifies, in the printer management database, a record having identification information that matches identification information including the user identification information and the node ID included in the received request. Then, the controller 61 registers pieces of information corresponding to the "SHEET JAM," "INK LOW," "INK EMPTY" and "REMAINING AMOUNT" and the like included in the request in respective items of the printer management database. The controller 61 also obtains the transmission timing from the printer management database. For example, in response to registering "ON" in a sub-item "INK LOW" of the item "MANAGEMENT INFORMATION," the controller 61 obtains the transmission timing registered in a sub-item "INK LOW" of an item "TRANSMISSION TIMING." Alternatively, the controller 61 obtains the transmission timing registered in the sub-item "NORMAL" of the item "TRANSMISSION TIMING" in response to "OFF" being registered in the sub-item "INK LOW" or "INK EMPTY" of the item "MANAGEMENT INFORMATION." Then, the controller 61 generates a response including the obtained transmission timing, and transmits the generated response to the printer 10 through the Internet 14 and the router 12. The controller 51 of the printer 10 sets the transmission timing included in the received response as an initial value and causes the timer counter to start a countdown.

Effects of Embodiment

The controller 51 of the printer 10 obtains the destination address of the information processing device 11 and the IP address of the printer 10 in the communication management database from the IC memory 18 of the cartridge 16 mounted in the mounting case 32. Then, the controller 51 stores the obtained destination address and IP address in a particular storage area of the EEPROM 57 to execute communication setting. That is, the operator who installs the printer 10 may only have to mount the cartridge 16, which is provided by the system administrator, in the mounting case 32 of the printer 10, so that an appropriate destination address and an IP address can be input to the printer 10 and communication setting of the printer 10 is completed. Therefore, the operator does not need to input the destination address and the IP address to the printer 10 using the touch sensor 44 and/or the operation switches 45 of the printer 10. Further, the operator will not erroneously input inappropriate destination address and IP address to the printer 10. As a result, the printer 10 can reduce labor of the operator installing the printer 10.

The controller 51 of the printer 10 obtains the printing condition information and the transmission type information from the IC memory 18 of the cartridge 16 mounted in the mounting case 32. Then, the controller 51 stores the obtained printing condition information and transmission type information in the EEPROM 57. Therefore, the operator does not need to input the printing condition information and the transmission type information to the printer 10 by using the touch sensor 44 and/or the operation switches 45 of the printer 10. In addition, the operator will not erroneously input inappropriate printing condition information and transmission type information to the printer 10. As a result, the printer 10 can further reduce labor of the operator installing the printer 10.

The controller 51 of the printer 10 changes the IP address changed by the user to the original appropriate IP address. Therefore, the printer 10 can be prevented from becoming unable to transmit information to the information processing device 11. In addition, security for the printer 10 within the communication system can be improved. Furthermore, the printer 10 can reduce labor of the user to change the IP address to the original IP address.

The controller 51 of the printer 10 stores the specific IP address, which cannot be changed by the user, in the second storage area of the EEPROM 57, and changes the IP address changed by the user to the original appropriate IP address by using the original specific IP address stored in the second storage area. Therefore, the labor of the system administrator can be reduced. More specifically, in a case where the controller 51 obtains the original appropriate IP address from the IC memory 18 of the cartridge 16 mounted in the mounting case 32, the IP address needs to be stored in the IC memory 18 of each and every cartridge 16 to be replaced. Since the controller 51 stores the original appropriate IP address in the second area of the EEPROM 57, it is not necessary to store the IP address in the IC memory 18 of every cartridge 16 to be replaced. As a result, it is possible to eliminate the labor of the system administrator for storing the IP address in the IC memory 18 of each and every cartridge 16 to be provided to the user.

The controller 51 of the printer 10 causes the display panel 43 to display the contract confirmation screen, transmits the initial notification information to the information processing device 11 in response to the user selecting the "OK" icon 81, and causes the information processing device 11 to start management of the printer 10. Therefore, the printer 10 can cause the information processing device 11 to start management of the printer 10 after confirming the user of the intention to make the contract.

Variation 1

In the above-described embodiment, the controller 51 of the printer 10 obtains the printing condition information and the transmission type information from the IC memory 18 of the cartridge 16 mounted in the mounting case 32. However, the controller 51 may obtain the printing condition information and the transmission type information from the information processing device 11. Specifically, in step S36 of FIG. 7, the controller 61 of the information processing device 11 receives the request including the initial notification information. The controller 61 identifies, in the printer management database, a record having identification information that matches the user identification information and the node ID included in the received request. Then, in response to the initial notification information being included in the received request, the controller 61 transmits a response including the printing condition information and the transmission type information registered in the identified record back to the printer 10. The controller 51 of the printer 10 receives the response transmitted by the information processing device 11. The controller 51 stores the printing condition information and the transmission type information included in the received response in the EEPROM 57. In this case, the IC memory 18 of the cartridge 16 does not store the printing condition information and the transmission type information. That is, the system administrator does not need to store the printing condition information and the transmission type information in the IC memory 18 of the cartridge 16.

In the present variation, the printer 10 can eliminate the labor of the operator inputting the printing condition information and the transmission type information to the printer 10 using the touch sensor 44 and/or the operation switches 45. Further, in the present variation, the printer 10 can eliminate the labor of the system administrator storing the printing condition information and the transmission type information in the IC memory 18 of the cartridge 16.

Variation 2

In the above-described embodiment, the controller 51 of the printer 10 changes the changed IP address to the original appropriate IP address (S86) when a failure occurs (S71: Yes) or when the transmission timing comes (S81: Yes). In the present variation, an example will be described in which the controller 51 changes the changed IP address to the original IP address (S86) in response to an elapsed time reaching a threshold time. The elapsed time is measured since reception of an instruction to change the IP address or since the change of the specific IP address.

In response to receiving the selection of the "OK" icon 84 on the IP address input screen (S93: OK), the controller 51 of the printer 10 causes a timer counter to start a countdown (S95). Alternatively, in response to overwriting the specific IP address stored in the first storage area of the EEPROM 57 with the IP address input to the text box (S94), the controller 51 causes the timer counter to start a countdown (S95). An initial value of the timer counter is a timer value stored in advance in the ROM 55 or EEPROM 57 of the memory 53.

Figure 10B:
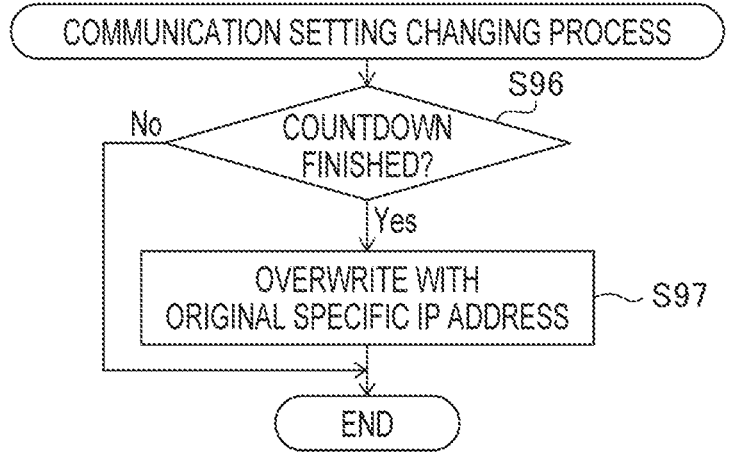
FIG. 10B is a flowchart of a communication setting changing process.

Then, the controller 51 of the printer 10 executes the communication setting changing process shown in FIG. 10B in place of the process of step S85 of the data transmission process (FIGS. 9A and 9B) or together with the process of step S85. For example, the controller 51 periodically executes the communication setting restoration process. First, the controller 51 determines whether the countdown that the timer counter started in step S95 has been finished (S96). When the controller 51 determines that the countdown has not been finished yet (S96: No), the controller 51 ends the communication setting restoration process. When the controller 51 determines that the countdown has been finished (S96: Yes), the controller 51 overwrites the IP address stored in the first storage area with the original specific IP address stored in the second storage area of the EEPROM 57 in the same manner as in step S93 of the above-described embodiment (S97).

In the present variation, when a certain time determined by the timer value elapses after the user changes the IP address, the changed IP address is changed to the original appropriate IP address. Therefore, the IP address is prevented from being kept changed for a long time. As a result, the printer 10 according to the present variation can further enhance security within the communication system.

Other Variations

In the above-described embodiment and variations, the timer counter counts down. However, the timer counter may count up. In this case, the controller 51 of the printer 10 determines that the timer counter finishes the count when the count value of the timer counter reaches the period indicated by the transmission timing or reaches the threshold time.

In the above-described embodiment, the communication network is the LAN 15 and the communication setting information is the IP address. However, the communication setting information may be information defined as a communication setting in the type of the communication network, that is, in a communication protocol used in the communication network.

The printer 10 in the above-described embodiment is an example of an image recording device according to aspects of the present disclosure. The print engine 40 in the above-described embodiment is an example of a print engine according to aspects of the present disclosure, and the print engine includes at least the recording unit 29. The mounting case 32 in the above-described embodiment is an example of a cartridge mount according to aspects of the present disclosure. The IC memory 18 in the above-described embodiment is an example of a cartridge memory according to aspects of the present disclosure. The cartridge I/F 49 in the above-described embodiment is an example of a cartridge interface according to aspects of the present disclosure. The touch sensor 44 and the operation switches 45 in the above-described embodiment are examples of a user interface according to aspects of the present disclosure. A local network configured using the LAN 15 in the above-described embodiment is an example of a communication network according to aspects of the present disclosure. The router 12 in the above-described embodiment is an example of a gateway device according to aspects of the present disclosure. The type information in the above-described embodiment is an example of appropriate authentication information according to aspects of the present disclosure. The model number in the above-described embodiment in a case where the model number indicates the contract usage mode or the normal usage mode is an example of the appropriate authentication information according to aspects of the present disclosure. The IP address "192.168.1.4" registered in the communication management database in association with the node ID indicating the printer 10 in the above-described embodiment is an example of a registered address according to aspects of the present disclosure. The printing condition information and the transmission type information in the above-described embodiment are examples of device setting information according to aspects of the present disclosure. The specific IP address in the above-described embodiment is an example of communication setting information according to aspects of the present disclosure. The characters "DO YOU WANT TO MAKE MANAGEMENT CONTRACT?" and the "OK" icon 81 in the above-described embodiment are examples of a permission object according to aspects of the present disclosure. The failure, ink low referring to the level of ink being low, and ink empty referring to the cartridge being empty of ink in the above-described embodiment are examples of an event according to aspects of the present disclosure. The information indicating the failure, the information indicating the ink empty and the information indicating that the ink low in the above-described embodiment are examples of event information according to aspects of the present disclosure. The selection of the "OK" icon 84 in the above-described embodiment is an example of a change instruction according to aspects of the present disclosure. The IP address input to the text box by the user in the above-described embodiment is an example of changed communication setting information according to aspects of the present disclosure. The specific IP address which is to be overwritten with the IP address input to the text box by the user in the above-described embodiment is an example of original communication setting information according to aspects of the present disclosure. The request transmitted by the printer 10 to the information processing device 11 in the above-described embodiment is an example of a reply instruction according to aspects of the present disclosure. The timer value in the above-described embodiment is an example of a threshold time according to aspects of the present disclosure. That the countdown the timer counter started after executing the process of step S93 has been finished (S96: Yes) in the above-described embodiment is an example of a first condition according to aspects of the present disclosure. That the countdown the timer counter started after executing the process of step S94 (S96: Yes) in the above-described embodiment is an example of a second condition according to aspects of the present disclosure. The occurrence of a failure (S71: Yes), the second total count value being greater than or equal to the second threshold value, and the second total count value being greater than or equal to the first threshold value in the above-described embodiment are examples of a third condition according to aspects of the present disclosure. That the timer counter has finished its countdown (S81: Yes) in the above-described embodiment is an example of a fourth condition indicating that a transmission timing has come according to aspects of the present disclosure.

What is claimed is:

1. An image recording device comprising:
a cartridge mount configured to hold a cartridge detachably;
a cartridge interface;
a print engine configured to execute printing;
a communication interface connectable to a communication network connected to the Internet;
memory; and
a controller,
wherein the controller is configured to:
determine whether appropriate authentication information has been obtained from a cartridge memory of the cartridge mounted in the cartridge mount through the cartridge interface;
in response to determining that the appropriate authentication information has been obtained, obtain, from the cartridge memory through the cartridge interface, a destination address of an information processing device connected to the Internet, communication setting information in the communication network, and identification information;
store the obtained communication setting information in the memory to execute communication setting; and
transmit transmission data including the identification information to the obtained destination address through the communication interface after executing the communication setting.

2. The image recording device according to claim 1, wherein the controller is configured to:
obtain, from the cartridge memory through the cartridge interface, device setting information including transmission type information and printing condition information, the transmission type information indicating a type of information to be included in the transmission data, the printing condition information indicating a printing condition on which the print engine executes printing.

3. The image recording device according to claim 1, wherein the controller is configured to:
transmit, to the information processing device through the communication interface, the transmission data including a reply instruction instructing the information processing device to transmit, to the image recording device, device setting information including transmission type information and printing condition information, the transmission type information indicating a type of information to be included in the transmission data, the printing condition information indicating a printing condition on which the print engine executes printing; and
obtain the device setting information transmitted by the information processing device through the communication interface.

4. The image recording device according to claim 1, wherein the controller is configured to:
in response to receiving a change instruction to change original communication setting information, which is the communication setting information stored in the memory, to changed communication setting information, store the changed communication setting information in the memory to change the communication setting;
determine whether a change condition is satisfied; and
in response to determining that the change condition is satisfied, change the communication setting from the changed communication setting information to the original communication setting information.

5. The image recording device according to claim 4, wherein the controller is configured to:
store the communication setting information obtained from the cartridge memory in a first storage area of the memory as information for executing the communication setting; and store the communication setting information obtained from the cartridge memory in a second storage area of the memory as the original communication setting information for changing the communication setting.

6. The image recording device according to claim 4, wherein the change condition includes:
- a first condition indicating that an elapsed time since reception of the change instruction has exceeded a threshold time stored in the memory;
- a second condition indicating that an elapsed time after changing the original communication setting information to the changed communication setting information has exceeded the threshold time stored in the memory;
- a third condition indicating that event information has been obtained, the event information indicating that an event has occurred in printing performed by the print engine; and
- a fourth condition indicating that a transmission timing for transmitting the transmission data to the information processing device through the communication interface has come, and wherein the controller is configured to determine that the change condition has been satisfied in response to determining that one of the first condition, the second condition, the third condition, or the fourth condition is satisfied.

7. The image recording device according to claim 1, wherein the communication setting information includes a specific IP address of the image recording device, the specific IP address being registered in advance to be recognized by a gateway device connected to the communication network.

8. The image recording device according to claim 1, further comprising a display panel and a user interface, wherein the controller is configured to:
- cause the display panel to display a permission object indicating permission of a contract in response to determining that the appropriate authentication information has been obtained; and
- in response to selection of the permission object through the user interface:
  - store the communication setting information obtained from the cartridge memory in the memory to execute the communication setting; and
  - transmit transmission data including the identification information to the obtained destination address through the communication interface.

9. An image recording device comprising:
- a cartridge mount configured to hold a plurality of cartridges detachably;
- a cartridge interface including a plurality of terminals, each terminal of the terminals corresponding to one cartridge of the cartridges;
- a print engine configured to execute printing;
- a communication interface connectable to a communication network connected to the Internet;
- memory; and
- a controller, wherein the controller is configured to:
- obtain a plurality of pieces of type information from a cartridge memory of each cartridge of the cartridges mounted in the cartridge mount through the cartridge interface;
- determine whether each piece of type information indicates a contract usage mode or a normal usage mode;
- in response to determining that all the pieces of type information indicate the contract usage mode, obtain a destination address of an information processing device connected to the Internet, a specific IP address of the image recording device in the communication network, and identification information of the image recording device in the communication network, from the cartridge memory of each cartridge through the cartridge interface;
- store the obtained specific IP address in the memory; and
- transmit transmission data including the identification information to the obtained destination address through the communication interface after storing the obtained specific IP address in the memory.

* * * * *